(12) United States Patent
Borovinskih et al.

(10) Patent No.: US 11,723,749 B2
(45) Date of Patent: *Aug. 15, 2023

(54) PHOTOGRAPH-BASED ASSESSMENT OF DENTAL TREATMENTS AND PROCEDURES

(71) Applicant: Align Technology, Inc., San Jose, CA (US)

(72) Inventors: Artem Borovinskih, San Jose, CA (US); Mitra Derakhshan, Herndon, VA (US); Carina Morik, Amsterdam (NL); Eric Meyer, Calabasas, CA (US); Ekaterina Tolstaya, Moscow (RU); Yury Brailov, Moscow (RU)

(73) Assignee: Align Technology, Inc., San Jose, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/353,535

(22) Filed: Jun. 21, 2021

(65) Prior Publication Data

US 2021/0312220 A1 Oct. 7, 2021

Related U.S. Application Data

(63) Continuation of application No. 16/370,788, filed on Mar. 29, 2019, now Pat. No. 11,042,774, which is a
(Continued)

(51) Int. Cl.
*A61C 7/00* (2006.01)
*G06T 7/00* (2017.01)
(Continued)

(52) U.S. Cl.
CPC ............ *A61C 7/002* (2013.01); *G06T 3/0031* (2013.01); *G06T 5/20* (2013.01); *G06T 7/0014* (2013.01);
(Continued)

(58) Field of Classification Search
None
See application file for complete search history.

(56) References Cited

U.S. PATENT DOCUMENTS 6,227,850 B1 5/2001 Chishti et al.
6,227,851 B1 5/2001 Chishti et al.
(Continued)

FOREIGN PATENT DOCUMENTS

JP         2009217799 A  *  9/2009
WO    WO-2015063032 A1  *  5/2015  ............... A61B 1/24

OTHER PUBLICATIONS

STIC provided translation of JP2009-217799 A (Year: 2009).*

*Primary Examiner* — Tyler W. Sullivan
(74) *Attorney, Agent, or Firm* — Shay Glenn LLP

(57) ABSTRACT

The current document is directed to methods and systems for monitoring a dental patient's progress during a course of treatment. A three-dimensional model of the expected positions of the patient's teeth can be projected, in time, from a three-dimensional model of the patient's teeth prepared prior to beginning the treatment. A digital camera is used to take one or more two-dimensional photographs of the patient's teeth, which are input to a monitoring system. The monitoring system determines virtual-camera parameters for each two-dimensional input image with respect to the time-projected three-dimensional model, uses the determined virtual-camera parameters to generate two-dimensional images from the three-dimensional model, and then compares each input photograph to the corresponding generated two-dimensional image in order to determine how closely the three-dimensional arrangement of the patient's teeth corresponds to the time-projected three-dimensional arrangement.

20 Claims, 36 Drawing Sheets

$$p(\mathbf{I}_1(\cdot,\cdot)=i)=p_{1,i}$$
$$p(\mathbf{I}_2(\cdot,\cdot)=i)=p_{2,i}$$ ⎫ 1350
$$p(\mathbf{I}_1(\cdot,\cdot)=i,\mathbf{I}_2(\cdot,\cdot)=j)=p_{1,2,i,j}$$ ⎭

$$H_1 = \sum_i p_{1,i} \log\left(\frac{1}{p_{1,i}}\right) = -\sum_i p_{1,i} \log p_{1,i}$$
$$H_2 = \sum_i p_{2,i} \log\left(\frac{1}{p_{2,i}}\right) = -\sum_i p_{2,i} \log p_{2,i}$$ ⎬ 1352
$$H_{1,2} = -\sum_{i,j} p_{1,2,i,j} \log p_{1,2,i,j}$$

$$MI(\mathbf{I}_1,\mathbf{I}_2) = H_1 + H_2 - H_{1,2}$$ — 1354
$$\text{cost}(\mathbf{I}_1,\mathbf{I}_2) = -MI(\mathbf{I}_1,\mathbf{I}_2)*G(\mathbf{I}_1,\mathbf{I}_2)$$ — 1356
$$G(\mathbf{I}_1,\mathbf{I}_2) = \sum_{x,y} f\left(\nabla \mathbf{I}_{1(x,y)}, \nabla \mathbf{I}_{2(x,y)}, TM_{(x,y)}\right)$$ — 1358

$$f(a,b,c) = \begin{cases} \cos(a,b)*\sqrt{\min(|a|,|b|)}, & \text{when } c \in \text{teeth} \\ 0, & \text{when } c \in \text{teeth} \end{cases}$$ — 1360

Related U.S. Application Data continuation of application No. 14/831,548, filed on Aug. 20, 2015, now Pat. No. 10,248,883.

(51) Int. Cl.
| | |
|---|---|
| *G06T 7/32* | (2017.01) |
| *G06T 7/136* | (2017.01) |
| *G06T 3/00* | (2006.01) |
| *G06T 7/269* | (2017.01) |
| *G06T 17/00* | (2006.01) |
| *G06V 30/182* | (2022.01) |
| *G06T 5/20* | (2006.01) |

(52) U.S. Cl.
CPC .............. *G06T 7/136* (2017.01); *G06T 7/269* (2017.01); *G06T 7/32* (2017.01); *G06T 17/00* (2013.01); *G06V 30/1831* (2022.01); *A61C 2007/004* (2013.01); *G06T 2207/30036* (2013.01)

(56) References Cited

U.S. PATENT DOCUMENTS

| | | | |
|---|---|---|---|
| 6,299,440 B1 | 10/2001 | Phan et al. |
| 6,318,994 B1 | 11/2001 | Chishti et al. |
| 6,371,761 B1 | 4/2002 | Cheang et al. |
| 6,386,878 B1 | 5/2002 | Pavlovskaia et al. |
| 6,406,292 B1 | 6/2002 | Chishti et al. |
| 6,409,504 B1 | 6/2002 | Jones et al. |
| 6,457,972 B1 | 10/2002 | Chishti et al. |
| 6,488,499 B1 | 12/2002 | Miller |
| 6,514,074 B1 | 2/2003 | Chishti et al. |
| 6,554,611 B2 | 4/2003 | Chishti et al. |
| 6,582,229 B1 | 6/2003 | Miller et al. |
| 6,621,491 B1 | 9/2003 | Baumrind et al. |
| 6,688,886 B2 | 2/2004 | Hughes et al. |
| 6,726,478 B1 | 4/2004 | Isiderio et al. |
| 6,729,876 B2 | 5/2004 | Chishti et al. |
| 6,739,869 B1 | 5/2004 | Taub et al. |
| 6,767,208 B2 | 7/2004 | Kaza |
| 6,783,360 B2 | 8/2004 | Chishti |
| 7,040,896 B2 | 5/2006 | Pavlovskaia et al. |
| 7,063,532 B1 | 6/2006 | Jones et al. |
| 7,074,038 B1 | 7/2006 | Miller |
| 7,074,039 B2 | 7/2006 | Kopelman et al. |
| 7,077,647 B2 | 7/2006 | Choi et al. |
| 7,108,508 B2 | 9/2006 | Hedge et al. |
| 7,134,874 B2 | 11/2006 | Chishti et al. |
| 7,156,661 B2 | 1/2007 | Choi et al. |
| 7,160,107 B2 | 1/2007 | Kopelman et al. |
| 7,241,142 B2 | 7/2007 | Abolfathi et al. |
| 7,293,988 B2 | 11/2007 | Wen |
| 7,309,230 B2 | 12/2007 | Wen |
| 7,357,634 B2 | 4/2008 | Knopp |
| 7,555,403 B2 | 6/2009 | Kopelman et al. |
| 7,637,740 B2 | 12/2009 | Knopp |
| 7,736,147 B2 | 6/2010 | Kaza et al. |
| 7,746,339 B2 | 6/2010 | Matov et al. |
| 7,844,356 B2 | 11/2010 | Matov et al. |
| 7,844,429 B2 | 11/2010 | Matov et al. |
| 7,865,259 B2 | 1/2011 | Kuo et al. |
| 7,878,804 B2 | 2/2011 | Korytov et al. |
| 7,880,751 B2 | 2/2011 | Kuo et al. |
| 7,904,308 B2 | 3/2011 | Arnone et al. |
| 7,930,189 B2 | 4/2011 | Kuo |
| 7,942,672 B2 | 5/2011 | Kuo |
| 7,970,627 B2 | 6/2011 | Kuo et al. |
| 7,970,628 B2 | 6/2011 | Kuo et al. |
| 8,038,444 B2 | 10/2011 | Kitching et al. |
| 8,044,954 B2 | 10/2011 | Kitching et al. |
| 8,075,306 B2 | 12/2011 | Kitching et al. |
| 8,092,215 B2 | 1/2012 | Stone-Collonge et al. |
| 8,099,268 B2 | 1/2012 | Kitching et al. |
| 8,126,726 B2 | 2/2012 | Matov et al. |
| 8,260,591 B2 | 9/2012 | Kass et al. |
| 8,275,180 B2 | 9/2012 | Kuo |
| 8,401,826 B2 | 3/2013 | Cheng et al. |
| 8,439,672 B2 | 5/2013 | Matov et al. |
| 8,562,338 B2 | 10/2013 | Kitching et al. |
| 8,591,225 B2 | 11/2013 | Wu et al. |
| 8,788,285 B2 | 7/2014 | Kuo |
| 8,843,381 B2 | 9/2014 | Kuo et al. |
| 8,874,452 B2 | 10/2014 | Kuo |
| 8,930,219 B2 | 1/2015 | Trosien et al. |
| 9,037,439 B2 | 5/2015 | Kuo et al. |
| 9,060,829 B2 | 6/2015 | Sterental et al. |
| 9,125,709 B2 | 9/2015 | Matty |
| 9,211,166 B2 | 12/2015 | Kuo et al. |
| 9,220,580 B2 | 12/2015 | Borovinskih et al. |
| 9,364,296 B2 | 6/2016 | Kuo |
| 9,414,897 B2 | 8/2016 | Wu et al. |
| 10,248,883 B2 * | 4/2019 | Borovinskih ............. G06T 7/32 |
| 10,307,221 B2 * | 6/2019 | Cinader, Jr. ............. A61C 7/00 |
| 10,342,638 B2 | 7/2019 | Kitching et al. |
| 10,463,452 B2 | 11/2019 | Matov et al. |
| 10,485,638 B2 * | 11/2019 | Salah ................... G06V 20/653 |
| 10,617,489 B2 | 4/2020 | Grove et al. |
| 10,722,328 B2 | 7/2020 | Velazquez et al. |
| 10,758,322 B2 | 9/2020 | Pokotilov et al. |
| 10,779,718 B2 | 9/2020 | Meyer et al. |
| 10,792,127 B2 | 10/2020 | Kopelman et al. |
| 10,828,130 B2 | 11/2020 | Pokotilov et al. |
| 10,835,349 B2 | 11/2020 | Cramer et al. |
| 10,973,611 B2 | 4/2021 | Pokotilov et al. |
| 10,996,813 B2 | 5/2021 | Makarenkova et al. |
| 10,997,727 B2 | 5/2021 | Xue et al. |
| 11,020,205 B2 | 6/2021 | Li et al. |
| 11,020,206 B2 | 6/2021 | Shi et al. |
| 11,026,766 B2 | 6/2021 | Chekh et al. |
| 11,033,359 B2 | 6/2021 | Velazquez et al. |
| 11,042,774 B2 * | 6/2021 | Borovinskih .......... A61C 7/002 |
| 11,071,608 B2 | 7/2021 | Derakhshan et al. |
| 11,096,763 B2 | 8/2021 | Akopov et al. |
| 11,151,753 B2 | 10/2021 | Gao et al. |
| 2003/0008259 A1 | 1/2003 | Kuo et al. |
| 2003/0143509 A1 | 7/2003 | Kopelman et al. |
| 2003/0207227 A1 | 11/2003 | Abolfathi |
| 2004/0137400 A1 | 7/2004 | Chishti et al. |
| 2004/0152036 A1 | 8/2004 | Abolfathi |
| 2004/0197728 A1 | 10/2004 | Abolfathi et al. |
| 2004/0259049 A1 | 12/2004 | Kopelman et al. |
| 2005/0182654 A1 | 8/2005 | Abolfathi et al. |
| 2005/0244791 A1 | 11/2005 | Davis et al. |
| 2006/0127836 A1 | 6/2006 | Wen |
| 2006/0127852 A1 | 6/2006 | Wen |
| 2006/0127854 A1 | 6/2006 | Wen |
| 2006/0275731 A1 | 12/2006 | Wen et al. |
| 2006/0275736 A1 | 12/2006 | Wen et al. |
| 2008/0306724 A1 | 12/2008 | Kitching et al. |
| 2010/0009308 A1 | 1/2010 | Wen et al. |
| 2010/0068672 A1 | 3/2010 | Arjomand et al. |
| 2010/0068676 A1 | 3/2010 | Mason et al. |
| 2010/0092907 A1 | 4/2010 | Knopp |
| 2010/0145898 A1 * | 6/2010 | Malfliet ............... A61B 6/5247 703/1 |
| 2010/0167243 A1 | 7/2010 | Spiridonov et al. |
| 2010/0214289 A1 * | 8/2010 | Xiao ..................... G06T 17/20 345/420 |
| 2013/0204599 A1 | 8/2013 | Matov et al. |
| 2013/0286174 A1 * | 10/2013 | Urakabe .......... A61B 1/000095 348/66 |
| 2016/0242870 A1 | 8/2016 | Matov et al. |
| 2016/0310235 A1 | 10/2016 | Derakhshan et al. |
| 2017/0273760 A1 | 9/2017 | Morton et al. |
| 2019/0053876 A1 | 2/2019 | Sterental et al. |
| 2019/0192259 A1 | 6/2019 | Kopelman et al. |
| 2019/0328487 A1 | 10/2019 | Levin et al. |
| 2019/0328488 A1 | 10/2019 | Levin et al. |
| 2019/0333622 A1 | 10/2019 | Levin et al. |
| 2019/0343601 A1 | 11/2019 | Roschin et al. |
| 2020/0000552 A1 | 1/2020 | Mednikov et al. |
| 2020/0000554 A1 | 1/2020 | Makarenkova et al. |
| 2020/0000555 A1 | 1/2020 | Yuryev et al. |

(56) References Cited

U.S. PATENT DOCUMENTS

| | | |
|---|---|---|
| 2020/0085546 A1 | 3/2020 | Li et al. |
| 2020/0107915 A1 | 4/2020 | Roschin et al. |
| 2020/0155274 A1 | 5/2020 | Pimenov et al. |
| 2020/0214800 A1 | 7/2020 | Matov et al. |
| 2020/0297458 A1 | 9/2020 | Roschin et al. |
| 2020/0306011 A1 | 10/2020 | Chekhonin et al. |
| 2020/0306012 A1 | 10/2020 | Roschin et al. |
| 2020/0315744 A1 | 10/2020 | Cramer |
| 2020/0360109 A1 | 11/2020 | Gao et al. |
| 2021/0073998 A1 | 3/2021 | Brown et al. |
| 2021/0134436 A1 | 5/2021 | Meyer et al. |
| 2021/0174477 A1 | 6/2021 | Shi et al. |

\* cited by examiner $$(X,Y,Z) \xrightarrow{h} (kX, kY, kZ, k) \text{ or } \xrightarrow{h^{-1}} \begin{bmatrix} X \\ Y \\ Z \end{bmatrix} \xrightarrow{h} \begin{bmatrix} kX \\ kY \\ kZ \\ k \end{bmatrix}$$

$$\mathbf{w} = \begin{bmatrix} X \\ Y \\ Z \end{bmatrix}$$

$$\mathbf{w}_h = \begin{bmatrix} kX \\ kY \\ kZ \\ k \end{bmatrix}$$

$$\mathbf{P} = \begin{bmatrix} 1 & 0 & 0 & 0 \\ 0 & 1 & 0 & 0 \\ 0 & 0 & 1 & 0 \\ 0 & 0 & -\frac{1}{r} & 1 \end{bmatrix}$$

$$\mathbf{c}_h = \mathbf{P}\mathbf{w}_h = \begin{bmatrix} 1 & 0 & 0 & 0 \\ 0 & 1 & 0 & 0 \\ 0 & 0 & 1 & 0 \\ 0 & 0 & -\frac{1}{r} & 1 \end{bmatrix} \begin{bmatrix} kX \\ kY \\ kZ \\ k \end{bmatrix} = \begin{bmatrix} kX \\ kY \\ kZ \\ -\frac{kZ}{r} + k \end{bmatrix} \xrightarrow{h^{-1}} \begin{bmatrix} \frac{X}{1-Z/r} \\ \frac{Y}{1-Z/r} \\ \frac{Z}{1-Z/r} \end{bmatrix} = \mathbf{c} = \begin{bmatrix} x \\ y \\ z \end{bmatrix}$$

$$\mathbf{P}^{-1} = \begin{bmatrix} 1 & 0 & 0 & 0 \\ 0 & 1 & 0 & 0 \\ 0 & 0 & 1 & 0 \\ 0 & 0 & \frac{1}{r} & 1 \end{bmatrix}$$

$$\mathbf{w}_h = \mathbf{P}^{-1}\mathbf{c}_h$$
$$\mathbf{c} = \begin{bmatrix} x_0 \\ y_0 \\ 0 \end{bmatrix} \leftrightarrow \begin{bmatrix} X \\ Y \\ 0 \end{bmatrix} = \mathbf{w}$$

FIG. 3C $$\mathbf{T}_{w_0} = \begin{bmatrix} 1 & 0 & 0 & -X_0 \\ 0 & 1 & 0 & -Y_0 \\ 0 & 0 & 1 & -Z_0 \\ 0 & 0 & 0 & 1 \end{bmatrix} \text{—370}$$

$$\mathbf{R} = \mathbf{R}_\alpha \mathbf{R}_\theta = \begin{bmatrix} \cos\theta & \sin\theta & 0 & 0 \\ -\sin\theta\sin\alpha & \cos\theta\cos\alpha & \sin\alpha & 0 \\ \sin\theta\sin\alpha & -\cos\theta\sin\alpha & \cos\alpha & 0 \\ 0 & 0 & 0 & 1 \end{bmatrix} \text{—372}$$

$$\mathbf{C} = \begin{bmatrix} 1 & 0 & 0 & -r_1 \\ 0 & 1 & 0 & -r_2 \\ 0 & 0 & 1 & -r_3 \\ 0 & 0 & 0 & 1 \end{bmatrix} \text{—374}$$

$\mathbf{c}_h = \mathbf{P}\,\mathbf{C}\,\mathbf{R}\,\mathbf{T}_{w_0}\,\mathbf{w}_h$ —376

$\mathbf{w}_h = \mathbf{T}_{w_0}^{-1}\,\mathbf{R}^{-1}\,\mathbf{C}^{-1}\,\mathbf{P}^{-1}\,\mathbf{c}_h$ —378

$(x,z) = f(X,Y,Z, \text{camera\_parameters})$ —380

$(X,Y,Z) = f^{-1}(x,z, \text{camera\_parameters})$ —381

FIG. 3D $$p(I_1(\cdot,\cdot) = i) = p_{1,i}$$

$$p(I_2(\cdot,\cdot) = i) = p_{2,i}$$

$$p(I_1(\cdot,\cdot) = i, I_2(\cdot,\cdot) = j) = p_{1,2,i,j}$$ — 1350

$$H_1 = \sum_i p_{1,i} \log\left(\frac{1}{p_{1,i}}\right) = -\sum_i p_{1,i} \log p_{1,i}$$

$$H_2 = \sum_i p_{2,i} \log\left(\frac{1}{p_{2,i}}\right) = -\sum_i p_{2,i} \log p_{2,i}$$ — 1352

$$H_{1,2} = -\sum_{i,j} p_{1,2,i,j} \log p_{1,2,i,j}$$

$$MI(I_1, I_2) = H_1 + H_2 - H_{1,2}$$ — 1354

$$cost(I_1, I_2) = -MI(I_1, I_2) * G(I_1, I_2)$$ — 1356

$$G(I_1, I_2) = \sum_{x,y} f\left(\nabla I_{1(x,y)}, \nabla I_{2(x,y)}, TM_{(x,y)}\right)$$ — 1358

$$f(a, b, c) = \begin{cases} \cos(a, b) * \sqrt{\min(|a|, |b|)}, & \text{when } c \in \text{teeth} \\ 0, & \text{when } c \notin \text{teeth} \end{cases}$$ — 1360

FIG. 13C $$\mathrm{cost}(x,y) = \begin{cases} \dfrac{\nabla \mathbf{I}_s \cdot \nabla \mathbf{I}_p}{|\nabla \mathbf{I}_s| \cdot |\nabla \mathbf{I}_p|} & \text{when } |\nabla \mathbf{I}_s| \text{ and } |\nabla \mathbf{I}_p| > T \\ 0, & \text{otherwise} \end{cases} \quad / 1720$$

$$\text{fitness 1} = \frac{1}{|\text{contour}|} \sum_{x,y \in \text{contour}} \mathrm{cost}(x,y) \quad / 1722$$

$$\text{fitness 2} = \sum_{x,y \in \text{contour}} \max_{t,s,\in \mathcal{E}_{x,y}} \mathrm{cost}(t,s) \quad / 1724$$

FIG. 17B

PHOTOGRAPH-BASED ASSESSMENT OF DENTAL TREATMENTS AND PROCEDURES

CROSS REFERENCE TO RELATED APPLICATIONS

This application is a continuation of U.S. patent application Ser. No. 16/370,788, filed on Mar. 29, 2019, titled "PHOTOGRAPH-BASED ASSESSMENT OF DENTAL TREATMENTS AND PROCEDURES," now U.S. Pat. No. 11,042,774, which is a continuation of U.S. patent application Ser. No. 14/831,548, filed Aug. 20, 2015, titled "PHOTOGRAPH-BASED ASSESSMENT OF DENTAL TREATMENTS AND PROCEDURES," now U.S. Pat. No. 10,248,883, each of which is incorporated herein by reference in its entirety for all purposes.

INCORPORATION BY REFERENCE

All publications and patent applications mentioned in this specification are herein incorporated by reference in their entirety to the same extent as if each individual publication or patent application was specifically and individually indicated to be incorporated by reference.

TECHNICAL FIELD

The current document is directed to methods and systems for monitoring patient progress during dental treatments and procedures and, in particular, to a photograph-based monitoring method, and system that carries out the method, that uses two-dimensional photographs taken during a patient examination to determine how well the patient's teeth correspond to a three-dimensional representation of the expected positions of patient's teeth according to the treatment plan.

BACKGROUND

Prior to the development of oral-cavity-imaging-and-modeling systems, dental practitioners employed mechanical-impression methods to create three-dimensional models of teeth and underlying tissue in order to facilitate fabrication of various types of prostheses, including crowns and bridges. The mechanical-impression technologies generally involved biting, by a patient, into a viscous, thixotropic material that retains an accurate impression of the patient's teeth and underlying tissue when the material is lifted off from the patient's teeth. The material may serve as a mold for casting a positive three-dimensional model of the patient's teeth and underlying gum tissue or as a mold for casting a prosthetic device. While mechanical-impression technologies have been used by dental practitioners for many decades, mechanical-impression technologies are associated with a variety of deficiencies, including a relatively large probability that the impression may be inadvertently altered or damaged during removal of the hardened, viscous, thixotropic material from the patient's teeth as well as during transportation of the impression to laboratories where positive three-dimensional models are cast and prostheses are fabricated. In addition, the procedure is time-consuming and unpleasant to many patients.

More recently, semi-automated oral-cavity-imaging-and-modeling systems have been developed to electronically create digital, three-dimensional models of teeth and underlying tissues from images of a patient's oral cavity captured by an electro-optical-mechanical endoscope, or wand, that is guided by a technician within a patient's oral cavity in order to collect a sufficient number of two-dimensional images from which a three-dimensional digital model of the patient's teeth and underlying tissues is computationally generated. The oral-cavity-imaging-and-modeling systems have proven to be faster, more accurate and robust, and more cost effective than mechanical-impression technologies.

In many cases, therefore, dental professionals can prepare accurate, three-dimensional models of a patient's teeth and use the three-dimensional models to analyze the patient's dental status and develop treatment plans for various types of deficiencies and pathologies. Furthermore, the three-dimensional model can be electronically manipulated to prepare projected three-dimensional configurations of the patient's teeth for various time points during the course of a treatment plan. Vendors of dental equipment, dental practitioners, and, ultimately, dental patients seek cost-effective and time-effective methods and systems to use the three-dimensional information in order to monitor a dental patient's progress during a course of treatment.

SUMMARY OF THE DISCLOSURE

The current document is directed to methods and systems for monitoring a dental patient's progress during a course of treatment. At any particular point in time during the course of treatment, a three-dimensional model of the expected positions of the patient's teeth at that point in time can be projected, in time, from a three-dimensional model of the patient's teeth prepared prior to beginning the treatment. During the course of treatment, a digital camera is used to take one or more two-dimensional photographs of the patient's teeth which are input to a monitoring system. The input two-dimensional photographs represent the actual positions of the patient's teeth. The monitoring system determines virtual-camera parameters for each two-dimensional input image with respect to the projected three-dimensional model and uses the determined virtual-camera parameters to generate two-dimensional images from the three-dimensional model. The generated two-dimensional photographs represent the expected or desired positions of the patient's teeth. The monitoring system then compares each input photograph to the corresponding generated two-dimensional image in order to determine how closely the three-dimensional arrangement of the patient's teeth corresponds to the projected three-dimensional arrangement. When the correspondence falls below a threshold level, an indication that the treatment is not proceeding according to plan is returned to a dental practitioner so that the dental practitioner can take corrective actions.

BRIEF DESCRIPTION OF THE DRAWINGS

FIGS. 3A-D illustrate one approach to mapping points in the world coordinate system to corresponding points on the image plane of a virtual camera.

FIGS. 13A-C illustrate computation of a gradient-based cost.

FIGS. 17A-B illustrate computation of the comparison value or correlation coefficient.

DETAILED DESCRIPTION

Figure 1:
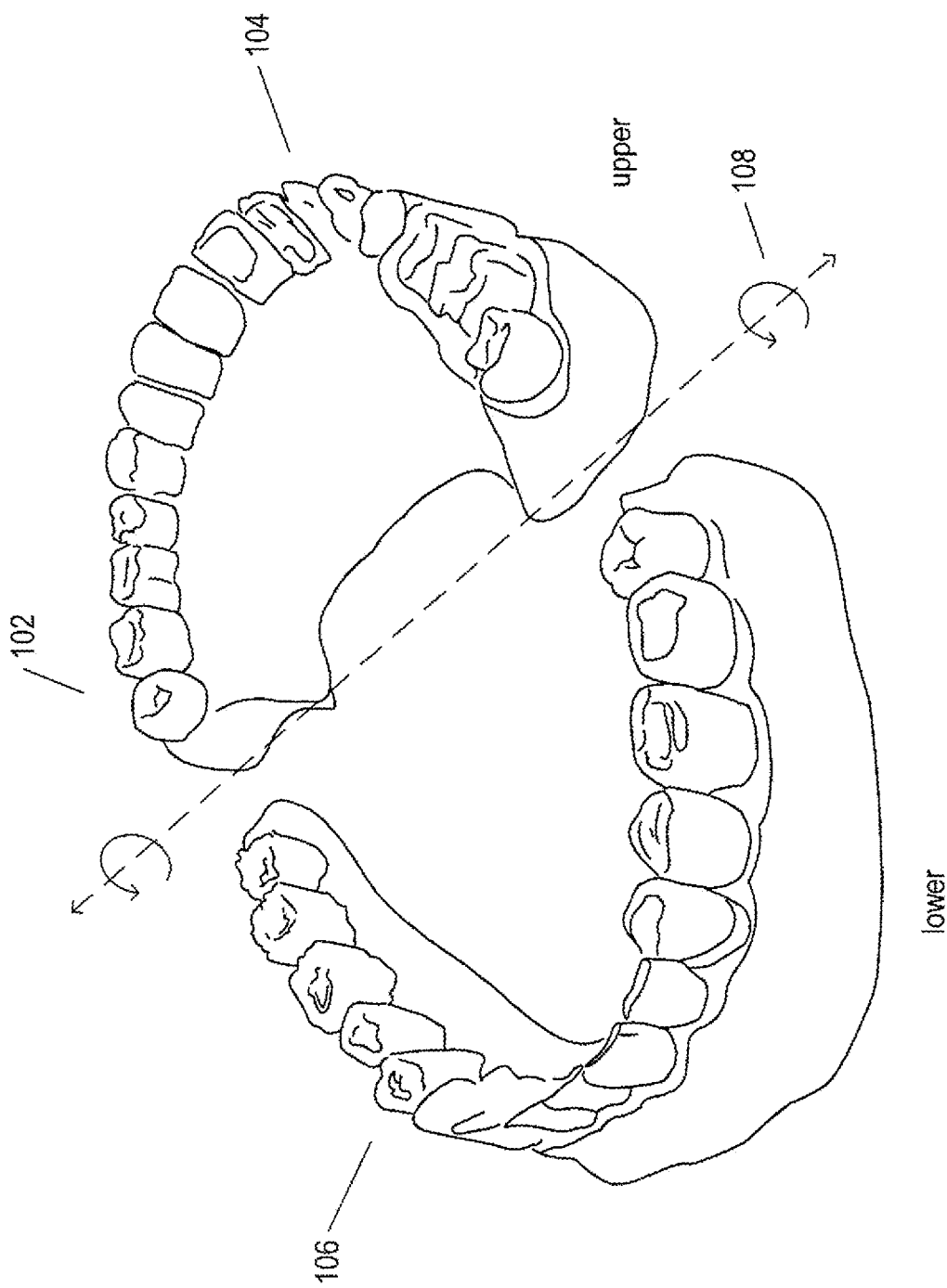
FIG. 1 illustrates a three-dimensional model of a dental patient's teeth.

FIG. 1 illustrates a three-dimensional model of a dental patient's teeth. The three-dimensional model 102 includes a three-dimensional model of the teeth associated with the dental patient's upper jaw 104 and a three-dimensional model of the dental patient's teeth associated with the lower jaw 106. The three-dimensional model is generally prepared, using sophisticated imaging and reconstruction hardware and software, based on optical scans of the dental patient's oral cavity. The three-dimensional model may be electronically represented in many different ways, similar to the many different ways in which three-dimensional objects may be represented in various different types of CAD/CAM and various imaging and solid-modeling systems. The model may be electronically presented in a variety of different orientations and configurations. For example, the two jaws 104 and 106 may be rotated about rotation axis 108 so that the teeth associated with the two jaws close together and assume a configuration similar to that in patient with a closed mouth. Each jaw and associated teeth may be, alternatively presented as a separate three-dimensional model.

Figure 2A:
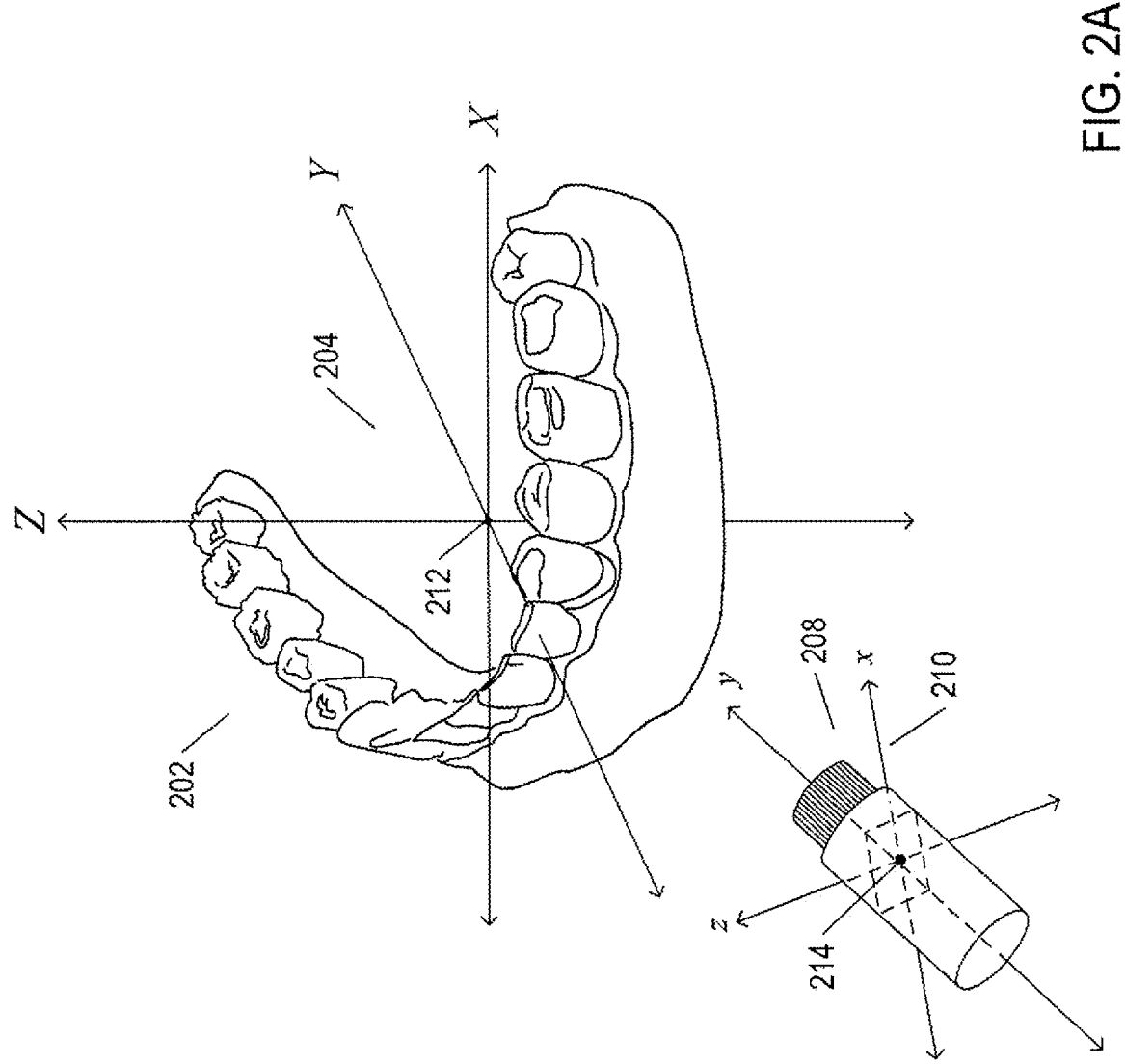
FIGS. 2A-B illustrate the relationship between a virtual-camera position and a three-dimensional model of a patient's teeth.
Figure 2B:
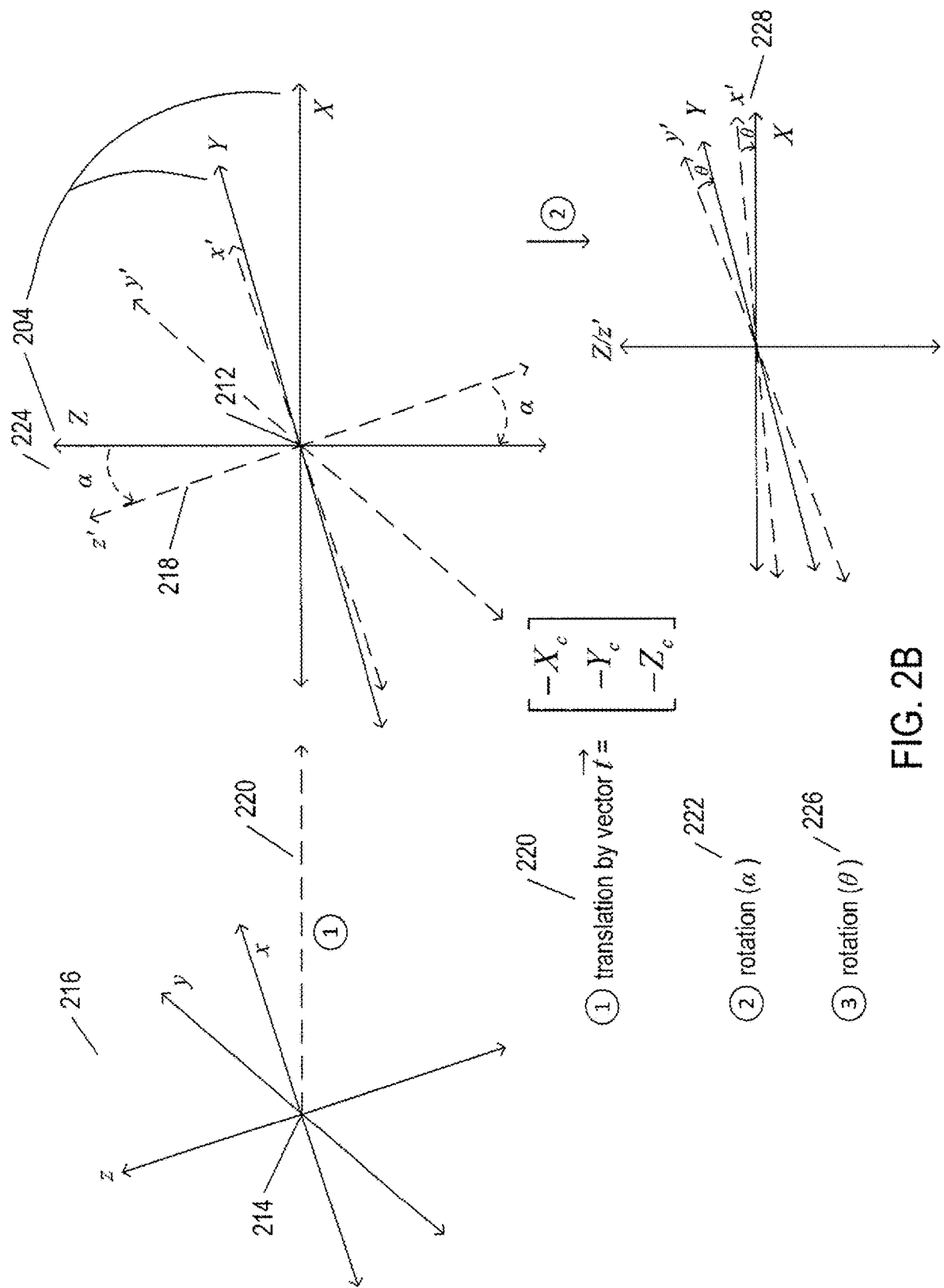

FIGS. 2A-B illustrate the relationship between a virtual-camera position and a three-dimensional model of a patient's teeth. As shown in FIG. 2A, the three-dimensional model of the dental patient's teeth 202 is translationally and rotationally positioned within a three-dimensional world coordinate system 204 having three mutually orthogonal axes X, Y, and Z. A two-dimensional view of the three-dimensional model can be obtained, from any position within the world coordinate system external to the three-dimensional model, by simulated image capture using a virtual camera 208. The virtual camera 208 is associated with its own three-dimensional coordinate system 210 having three mutually orthogonal axes x, y, and z. The world coordinate system and the camera coordinate system are, of course, mathematically related by a translation of the origin of the camera x, y, z coordinate system from the origin 212 of the world coordinate system and by three rotation angles that, when applied to the camera, rotate the camera x, y, and z coordinate system with respect to the world X, Y, Z coordinate system. The origin 214 of the camera x, y, z coordinate system has the coordinates (0, 0, 0) in the camera coordinate system and the coordinates $(X_c, Y_c, \text{and } Z_c)$ in the world coordinate system. The two-dimensional image captured by the virtual camera 216 can be thought of as lying in the x, z plane of the camera coordinate system and centered at the origin of the camera coordinate system, as shown in FIG. 2.

FIG. 2B illustrates operations involved with orienting and positioning the camera x, y, z coordinate system to be coincident with the world X, Y, Z coordinate system. In FIG. 2B, the camera coordinate system 216 and world coordinate system 204 are centered at two different origins, 214 and 212, respectively, and the camera coordinate system is oriented differently than the world coordinate system. In order to orient and position the camera x, y, z coordinate system to be coincident with the world X, Y, Z coordinate system, three operations are undertaken. A first operation 220 involves translation of the camera-coordinate system, by a displacement represented by a vector t, so that the origins 214 and 212 of the two coordinate systems are coincident. The position of the camera coordinate system with respect to the world coordinate system is shown with dashed lines, including dashed line 218, with respect to the world coordinate system following the translation operation 220. A second operation 222 involves rotating the camera coordinate system by an angle α (224) so that the z axis of the camera coordinate system, referred to as the z' axis following the translation operation, is coincident with the Z axis of the world coordinate system. In a third operation 226, the camera coordinate system is rotated about the Z/z' axis by an angle θ (228) so that all of the camera-coordinate-system axes are coincident with their corresponding world-coordinate-system axes.

Figure 3A:
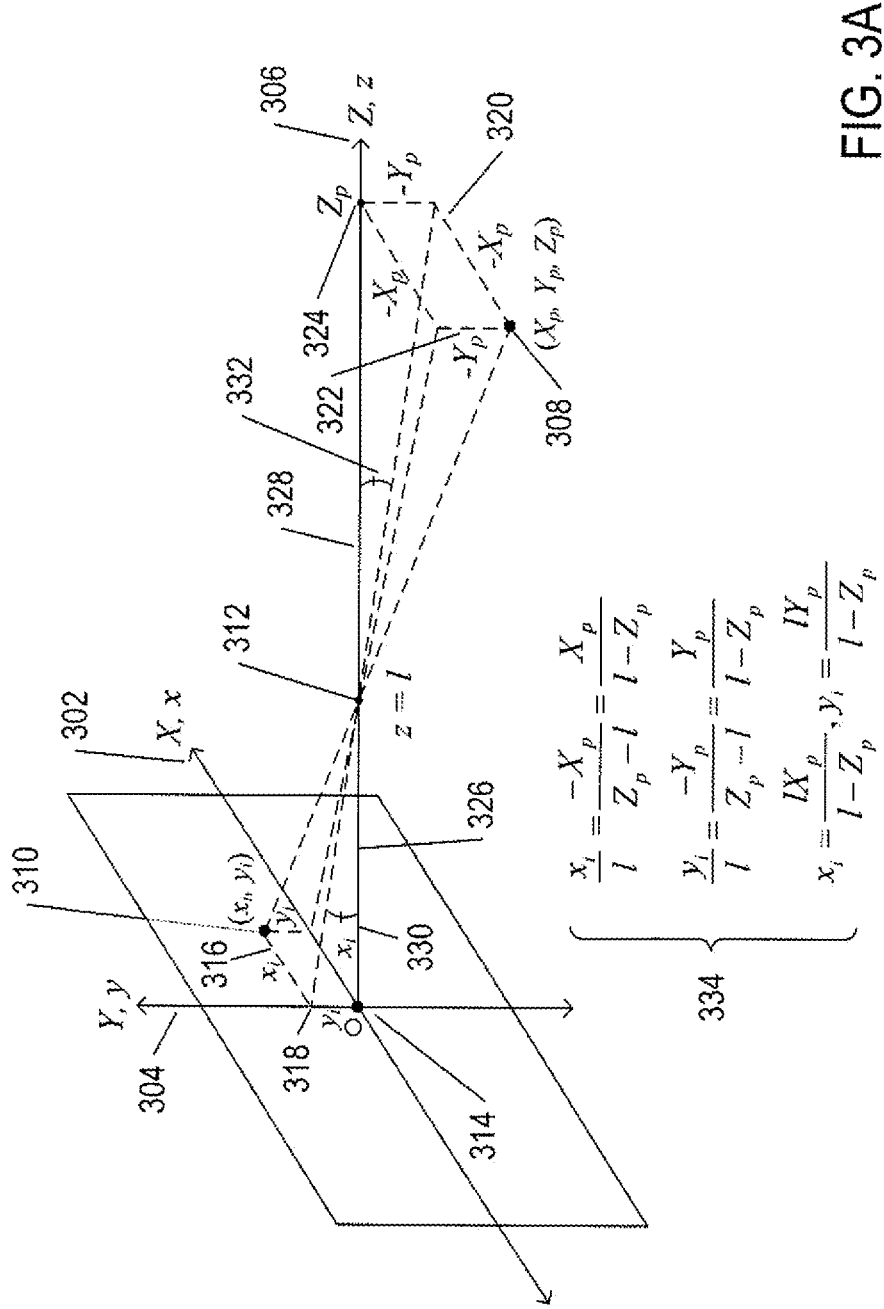

FIGS. 3A-D illustrate one approach to mapping points in the world coordinate system to corresponding points on the image plane of a virtual camera. This process allows virtual cameras to be positioned anywhere within space with respect to a computational three-dimensional model of a patient's teeth and used to generate a two-dimensional image that corresponds to the two-dimensional image that would be captured from a real camera having the same position and orientation with respect to an equivalent solid-model three-dimensional representation of a patient's teeth. FIG. 3A illustrates the image plane of a virtual camera, an aligned camera coordinate system and world coordinate system, and a point in three-dimensional space that is imaged on the image plane of the virtual camera. In FIG. 3A, and in FIGS. 3B-D that follow, the camera coordinate system, comprising the x, y, and z axes, is aligned and coincident with the world-coordinate system X, Y, and Z. This is indicated, in FIG. 3A, by dual labeling of the x and X axis 302, the y and Y axis 304, and the z and Z axis 306. The point that is imaged 308 is shown to have the coordinates ($X_p$, $Y_p$, and $Z_p$). The image of this point on the virtual-camera image plane 310 has the coordinates ($x_i$, $y_i$). The virtual lens of the virtual camera is centered at the point 312, which has the camera coordinates (0, 0, 1) and the world coordinates (0, 0, 1). When the point 308 is in focus, the distance/between the origin 314 and point 312 is the focal length of the virtual camera. Note that, in FIG. 3A, the z axis is used as the axis of symmetry for the virtual camera rather than the y axis, as in FIG. 2A. A small rectangle is shown, on the image plane, with the corners along one diagonal coincident with the origin 314 and the point 310 with coordinates ($x_i$, $y_i$). The rectangle has horizontal sides, including horizontal side 316, of length $x_i$, and vertical sides, including vertical side 318, with lengths $y_i$. A corresponding rectangle with horizontal sides of length $-X_p$, including horizontal side 320, and vertical sides of length $-Y_p$, including vertical side 322. The point 308 with world coordinates $X_p$, $Y_p$, and $Z_p$) and the point 324 with world coordinates (0, 0, $Z_p$) are located at the corners of one diagonal of the corresponding rectangle. Note that the positions of the two rectangles are inverted through point 312. The length of the line segment 328 between point 312 and point 324 is $Z_p-1$. The angles at which each of the lines passing through point 312 intersects the z, Z axis 326 are equal on both sides of point 312. For example, angle 330 and angle 332 are identical. As a result, the principal of the correspondence between the lengths of similar sides of similar triangles can be used to derive expressions for the image-plane coordinates ($x_i$, $y_i$) for an imaged point in three-dimensional space with world coordinates ($X_p$, $Y_p$, and $Z_p$) 334:

$$\frac{x_i}{l} = \frac{-X_p}{Z_p - 1} = \frac{X_p}{1 - Z_p}$$

$$\frac{y_i}{l} = \frac{-Y_p}{Z_p - 1} = \frac{Y_p}{1 - Z_p}$$

$$x_i = \frac{lX_p}{1 - Z_p}, \ y_i = \frac{lY_p}{1 - Z_p}$$

Figure 3B:
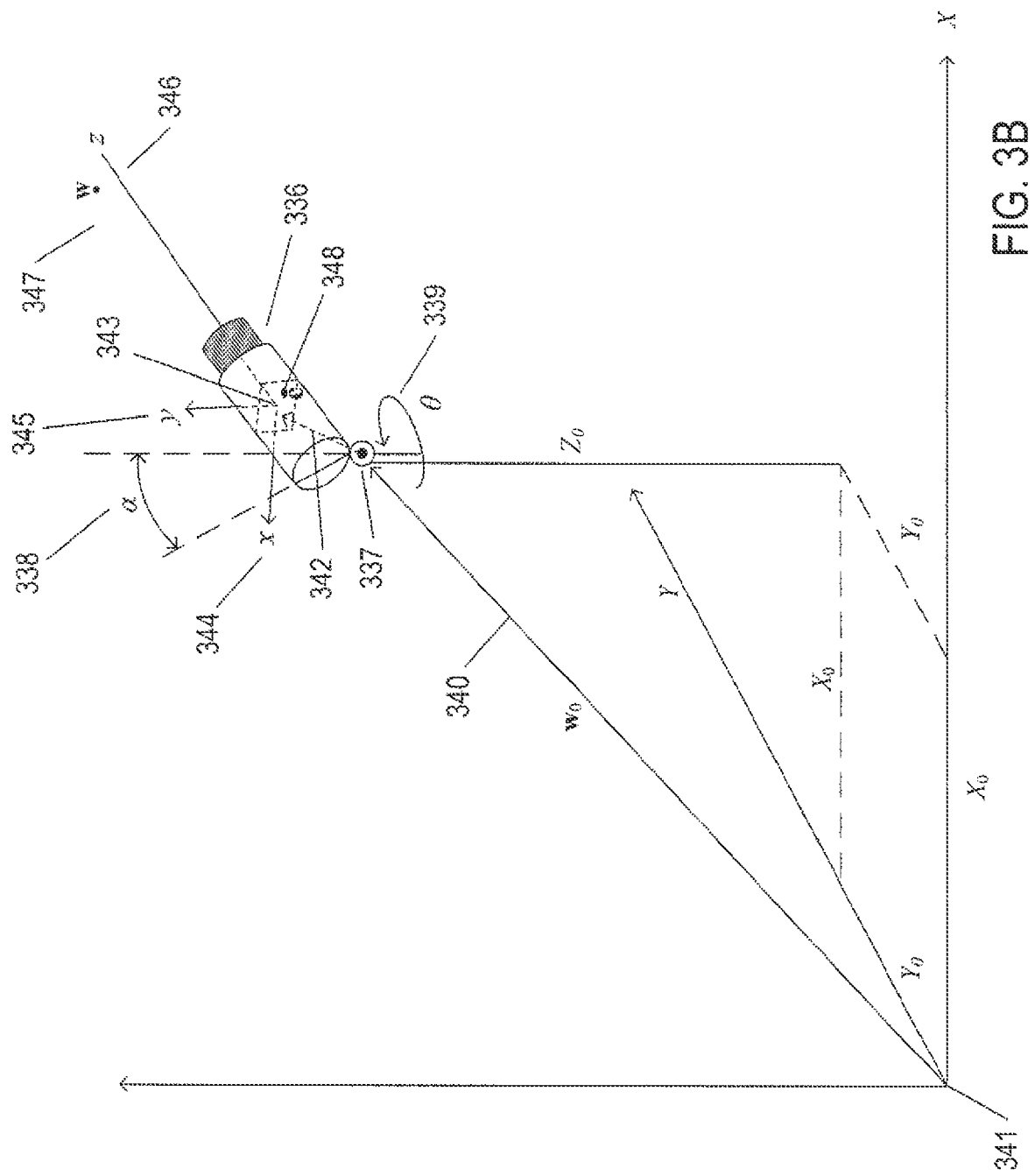

Of course, virtual-camera coordinate systems are not, in general, aligned with the world coordinate system, as discussed above with reference to FIG. 2A. Therefore, a slightly more complex analysis is required to develop the functions, or processes, that map points in three-dimensional space to points on the image plane of a virtual camera. FIGS. 3B-D illustrate the process for computing the image of points in a three-dimensional space on the image plane of an arbitrarily oriented and positioned virtual camera. FIG. 3B shows the arbitrarily positioned and oriented virtual camera. The virtual camera 336 is mounted to a mount 337 that allows the virtual camera to be tilted by an angle α 338 with respect to the vertical Z axis and to be rotated by an angle θ 339 about a vertical axis. The mount 337 can be positioned anywhere in three-dimensional space, with the position represented by a position vector $w_0$ 340 from the origin of the world coordinate system 341 to the mount 337. A second vector r 342 represents the relative position of the center of the image plane 343 within the virtual camera 336 with respect to the mount 337. The orientation and position of the origin of the camera coordinate system coincides with the center of the image plane 343 within the virtual camera 336. The image plane 343 lies within the x, y plane of the camera coordinate axes 344-346. The camera is shown, in FIG. 3B, imaging a point w 347, with the image of the point w appearing as image point c 348 on the image plane 343 within the virtual camera. The vector wo that defines the position of the camera mount 337 is shown, in FIG. 3B, to be the vector $$w_0 = \begin{bmatrix} X_0 \\ Y_0 \\ Z_0 \end{bmatrix}$$

FIGS. 3C-D show the process by which the coordinates of a point in three-dimensional space, such as the point corresponding to vector w in world-coordinate-system coordinates, is mapped to the image plane of an arbitrarily positioned and oriented virtual camera. First, a transformation between world coordinates and homogeneous coordinates h and the inverse transformation $h^{-1}$ is shown in FIG. 3C by the expressions 350 and 351. The forward transformation from world coordinates 352 to homogeneous coordinates 353 involves multiplying each of the coordinate components by an arbitrary constant k and adding a fourth coordinate component k. The vector w corresponding to the point 347 in three-dimensional space imaged by the virtual camera is expressed as a column vector, as shown in expression 354 in FIG. 3C. The corresponding column vector $w_h$ in homogeneous coordinates is shown in expression 355. The matrix P is the perspective transformation matrix, shown in expression 356 in FIG. 3C. The perspective transformation matrix is used to carry out the world-to-camera coordinate transformations (334 in FIG. 3A) discussed above with reference to FIG. 3A. The homogeneous-coordinate-form of the vector c corresponding to the image 348 of point 347, $c_h$, is computed by the left-hand multiplication of $w_h$ by the perspective transformation matrix, as shown in expression 357 in FIG. 3C. Thus, the expression for $c_h$ in homogeneous camera coordinates 358 corresponds to the homogeneous expression for $c_h$ in world coordinates 359. The inverse homogeneous-coordinate transformation 360 is used to transform the latter into a vector expression in world coordinates 361 for the vector c 362. Comparing the camera-coordinate expression 363 for vector c with the world-coordinate expression for the same vector 361 reveals that the camera coordinates are related to the world coordinates by the transformations (334 in FIG. 3A) discussed above with reference to FIG. 3A. The inverse of the perspective transformation matrix, $P^{-1}$, is shown in expression 364 in FIG. 3C. The inverse perspective transformation matrix can be used to compute the world-coordinate point in three-dimensional space corresponding to an image point expressed in camera coordinates, as indicated by expression 366 in FIG. 3C. Note that, in general, the Z coordinate for the three-dimensional point imaged by the virtual camera is not recovered by the perspective transformation. This is because all of the points in front of the virtual camera along the line from the image point to the imaged point are mapped to the image point. Additional information is needed to determine the Z coordinate for three-dimensional points imaged by the virtual camera, such as depth information obtained from a set of stereo images or depth information obtained by a separate depth sensor.

Three additional matrices are shown in FIG. 3D that represent the position and orientation of the virtual camera in the world coordinate system. The translation matrix $T_{w_0}$ 370 represents the translation of the camera mount (337 in FIG. 3B) from its position in three-dimensional space to the origin (341 in FIG. 3B) of the world coordinate system. The matrix R represents the $\alpha$ and $\theta$ rotations needed to align the camera coordinate system with the world coordinate system 372. The translation matrix C 374 represents translation of the image plane of the virtual camera from the camera mount (337 in FIG. 3B) to the image plane's position within the virtual camera represented by vector r (342 in FIG. 3B). The full expression for transforming the vector for a point in three-dimensional space $w_h$ into a vector that represents the position of the image point on the virtual-camera image plane $c_h$ is provided as expression 376 in FIG. 3D. The vector $w_h$ is multiplied, from the left, first by the translation matrix 370 to produce a first intermediate result, the first intermediate result is multiplied, from the left, by the matrix R to produce a second intermediate result, the second intermediate result is multiplied, from the left, by the matrix C to produce a third intermediate result, and the third intermediate result is multiplied, from the left, by the perspective transformation matrix P to produce the vector $c_h$. Expression 378 shows the inverse transformation. Thus, in general, there is a forward transformation from world-coordinate points to image points 380 and, when sufficient information is available, an inverse transformation 381. It is the forward transformation 380 that is used to generate two-dimensional images from a three-dimensional model or object corresponding to arbitrarily oriented and positioned virtual cameras. Each point on the surface of the three-dimensional object or model is transformed by forward transformation 380 to points on the image plane of the virtual camera.

Figure 4:
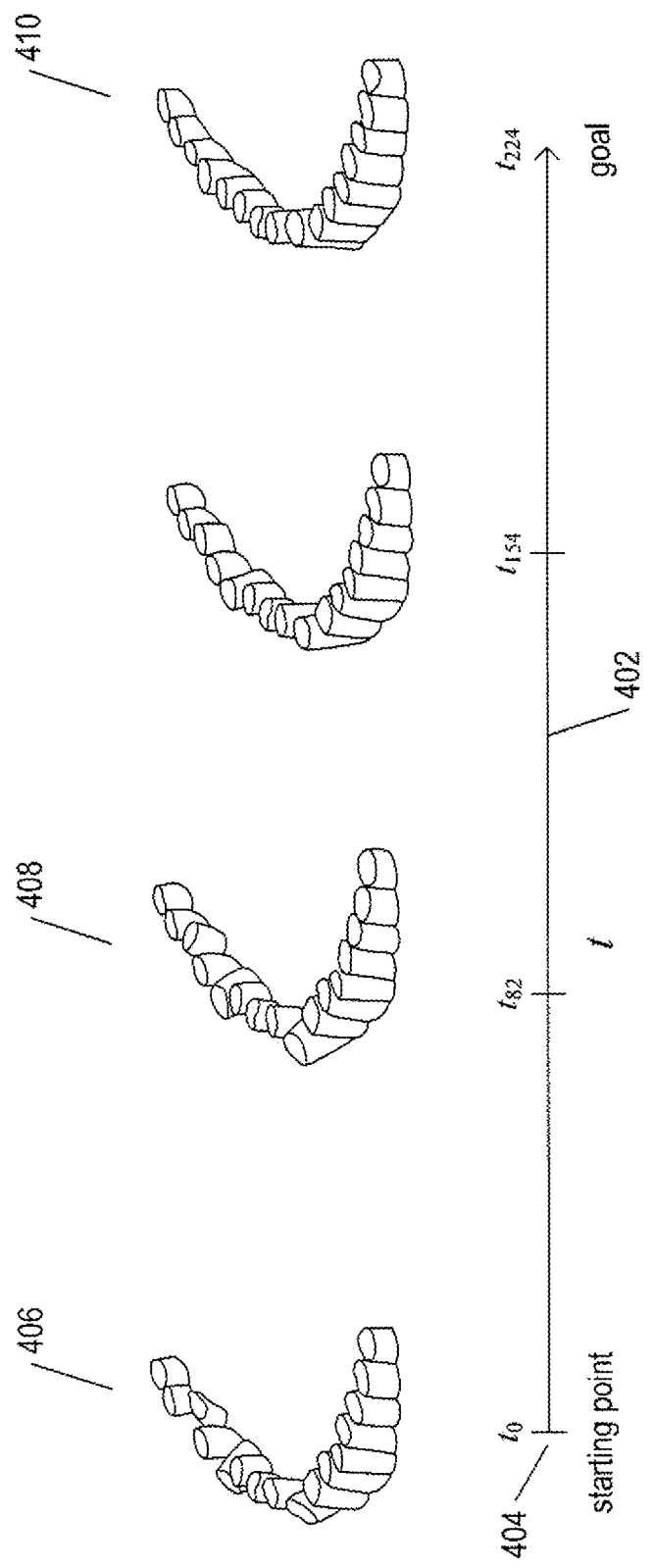
FIG. 4 illustrates a continuum of three-dimensional models of a dental patient's teeth that can be electronically prepared to reflect the expected arrangements of the dental patient's teeth during the course of a proposed treatment plan.

FIG. 4 illustrates a continuum of three-dimensional models of a dental patient's teeth that can be electronically prepared to reflect the expected arrangements of the dental patient's teeth during the course of a proposed treatment plan. In FIG. 4, lower horizontal arrow 402 represents the timeline of the treatment plan. At an initial starting point 404, specified in FIG. 4 as time $t_0$, the arrangement of the dental patient's teeth is captured in an initial three-dimensional model 406 of the patient's teeth. A time-projected three-dimensional model, such as three-dimensional model 408, can be electronically prepared as an estimate of how the dental patient's teeth are expected to be arranged at a future point in time $t_{82}$ or $t_{154}$ during the course of the treatment or procedure. As shown in FIG. 4, the final time-projected three-dimensional model 410 in the continuous series of three-dimensional models represents the goal for the treatment or procedure that is expected to be obtained at time $t_{224}$. Although only four three-dimensional models are shown in both the treatment or procedure timeline 402 in FIG. 4, a time-projected three-dimensional model for any point along the timeline can be electronically prepared using extrapolation and simulation-based methodologies.

Figure 5A:
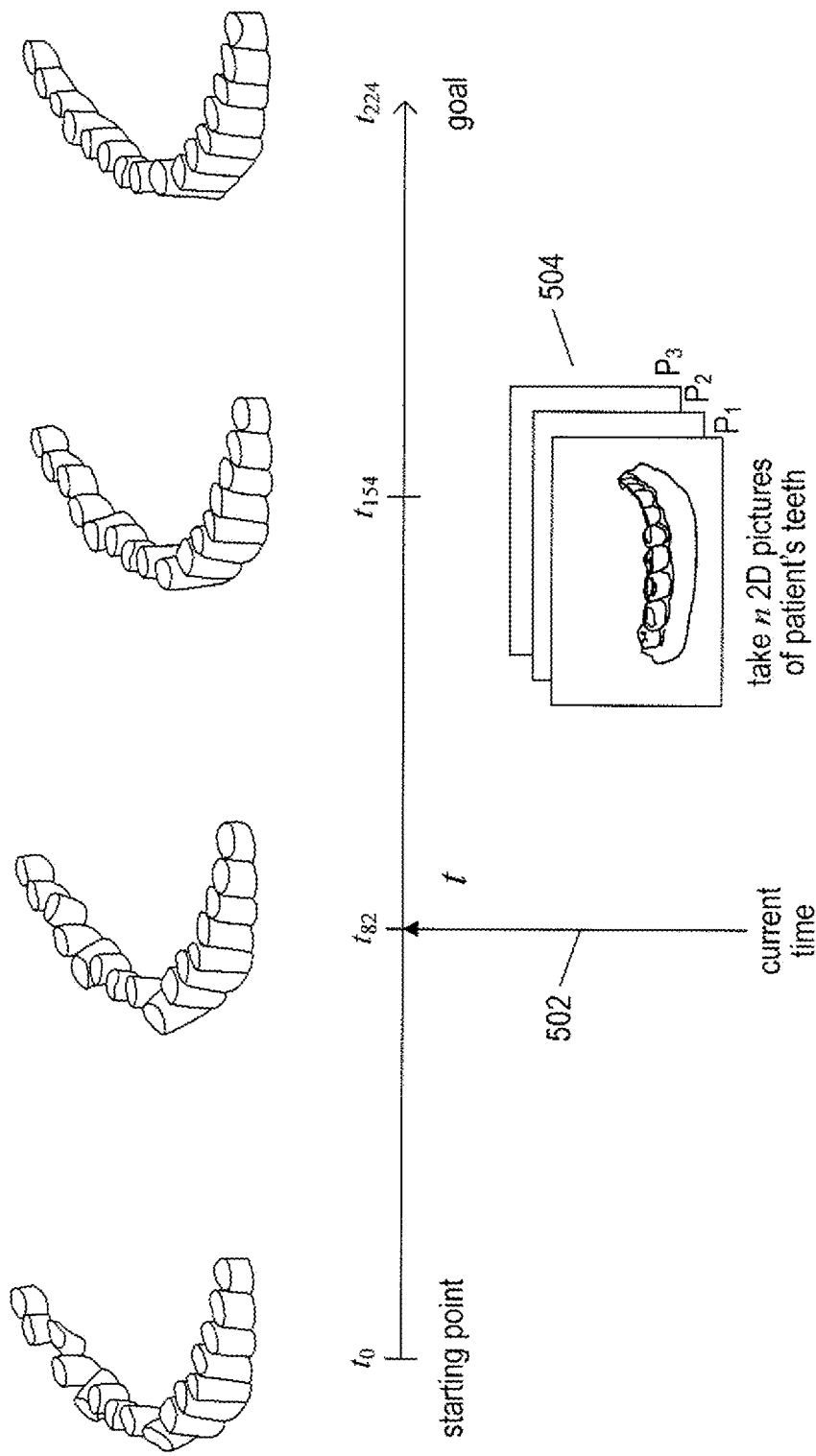
FIGS. 5A-D graphically illustrate the treatment-monitoring method to which the current document is, in part, directed.
Figure 5B:
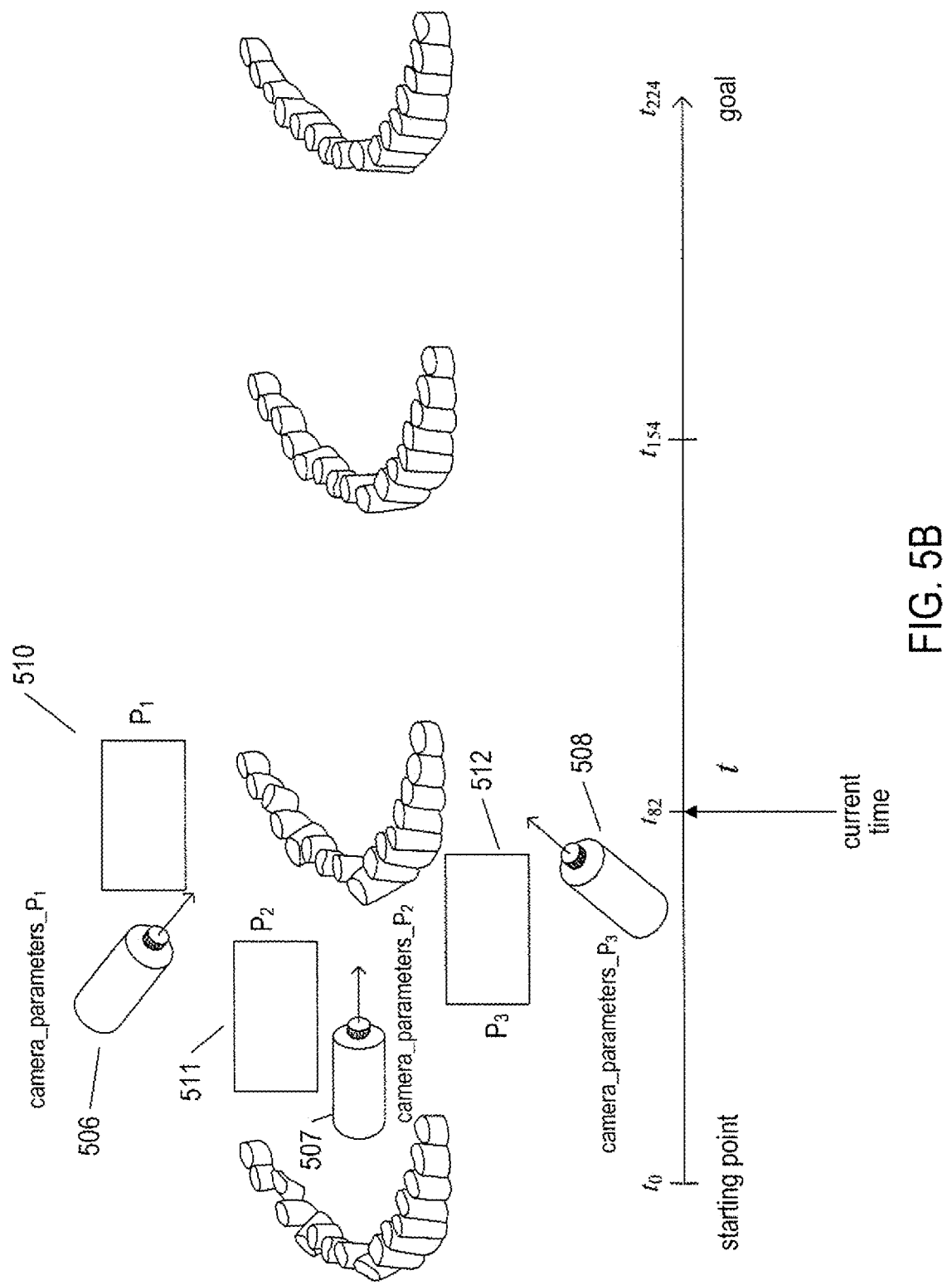

FIGS. 5A-D graphically illustrate the treatment-monitoring method to which the current document is, in part, directed. As shown in FIG. 5A, at a particular current point in time, $t_{82}$, during a dental patient's treatment or procedure, represented in FIG. 5A by vertical arrow 502, a dental practitioner examines the patient and takes a number n of two-dimensional pictures of the patient's teeth 504 ($P_1$, $P_2$, $P_3$). Alternatively, in certain implementations, the two-dimensional pictures may be taken by a patient's friend or relative, or even the patient, using a camera timer or smartphone features that facilitate acquisition of images of a user. In the current example, n is equal to 3. In general, each photograph or subset of the photographs represents a certain, standard view or image type. A dental practitioner or other person is provided with instructions for capturing an image of a particular standard view or type. As shown in FIG. 5B, once the practitioner has submitted these two-dimensional images, along with patient information, an indication of the time that the two-dimensional images were captured, and other such information, the treatment-monitoring system, to which the current document is, in part, directed, determines camera parameters for virtual cameras 506-508, the orientations and positions of which most likely correspond to the camera parameters of the dental practitioner's camera at the points in time at which each of the corresponding n two-dimensional pictures, 510-512, respectively, were captured by the dental practitioner or other person.

Figure 5C:
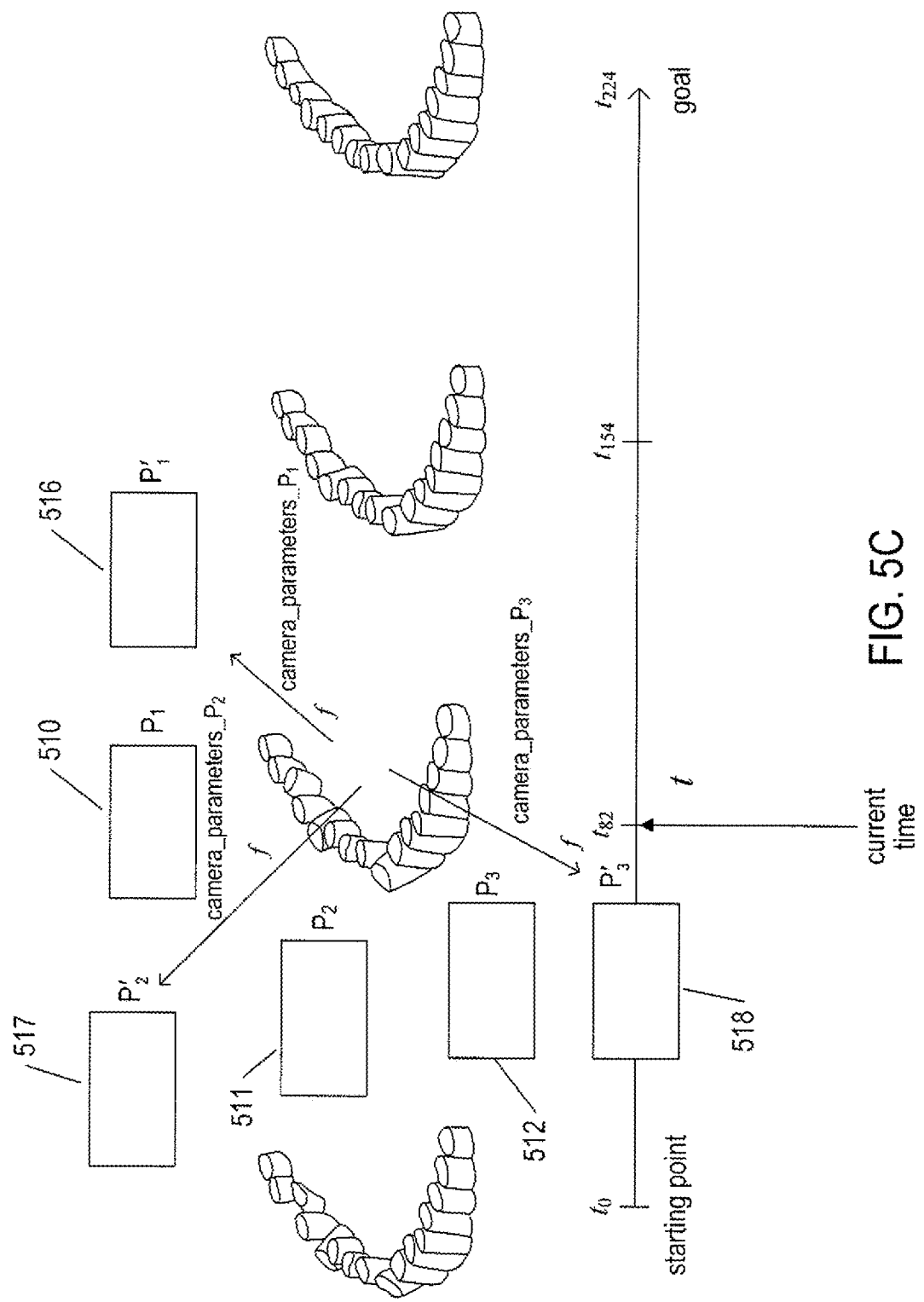
Figure 5D:
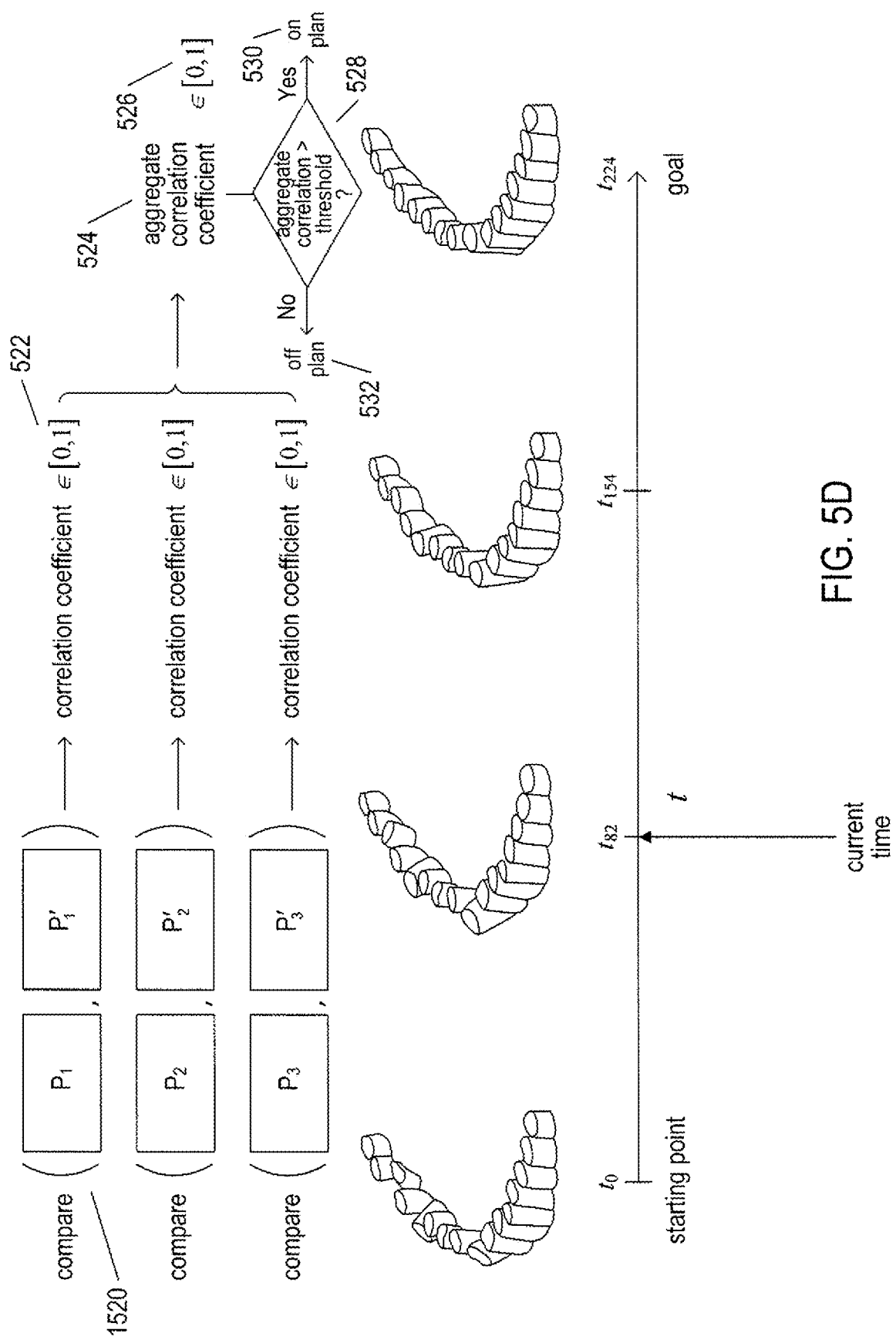

Next, as shown in FIG. 5C, the determined camera parameters for the virtual cameras are used to generate corresponding two-dimensional images 516-518 corresponding to the n two-dimensional images 510-512 taken by the dental practitioner or other person. Finally, as shown in FIG. 5D, a comparison operation, such as comparison operation 1520, is applied to each pair of a dental-practitioner-submitted image and a corresponding image generated from the three-dimensional model in order to produce a correlation coefficient. In one implementation, the correlation coefficients are expressed as floating point values between 0 and 1 (522 in FIG. 5D). The correlation coefficients for the individual images are used to generate a single aggregate correlation value 524, in one implementation of the currently described method and system, which is also a floating-point value between 0 and 1 (526 in FIG. 5D). When the aggregate correlation value computed from the submitted two-dimensional images and the projected three-dimensional model is greater than a threshold value, as determined in step 528, then the treatment-monitoring system stores, in memory, and returns an indication that the treatment is proceeding according to plan 530 ("Yes"). Otherwise, the treatment-monitoring system stores, in memory, and returns an indication that the treatment is not going according to plan 532 ("No"). It should be noted that, in certain implementations, multiple images for a given standard view may be used for generating correlation coefficients and an aggregate correlation coefficient. In other implementations, including an implementation discussed below, a best representative image for each standard view is selected for processing.

Figure 6:
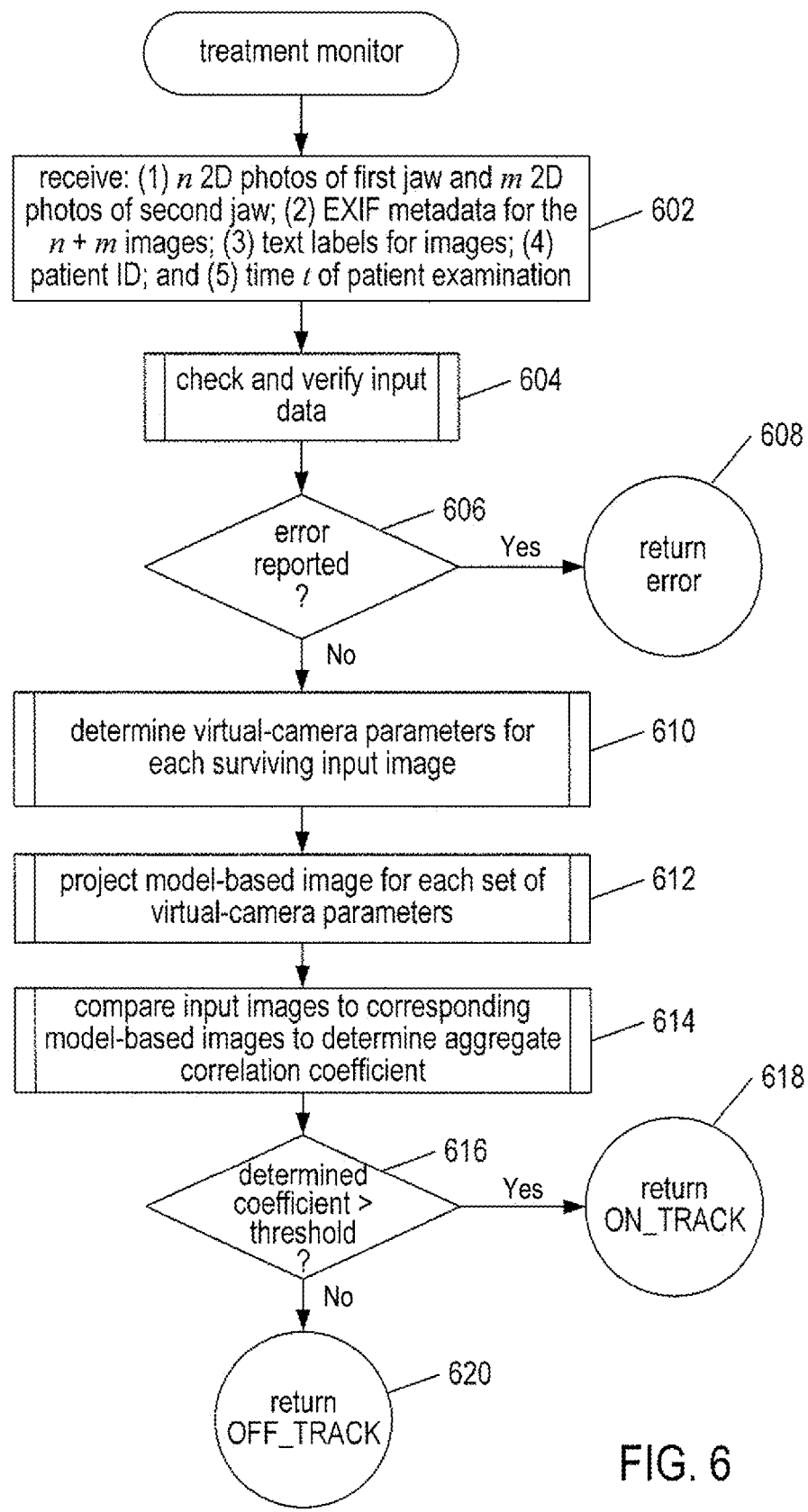
FIG. 6 provides a control-flow-diagram illustration of the operation of the treatment-monitoring system and treatment-monitoring method to which the current document is directed.

FIG. 6 provides a control-flow-diagram illustration of the operation of the treatment-monitoring system and treatment-monitoring method to which the current document is directed. Additional control-flow diagrams, discussed below, provide greater detail for various steps in the highest-level control-flow diagram shown in FIG. 6. In step 602, the treatment-monitoring method and/or system ("treatment monitor") receives: (1) n two-dimensional photographs of a first jaw and m two-dimensional photographs of a second jaw of a dental patient examined during the course of a treatment or procedure; (2) exchangeable-image-file-format ("EXIF") metadata for each of the n+m two-dimensional images; (3) text labels for the two-dimensional images, which include, among other things, an indication of a standard type of view represented by each image and characterizations and parameters for the digitally encoded image, including the size of the image, date and time information, and camera settings, including one or more of the camera model and make and camera orientation, aperture, shutter speed, focal length, metering mode, and International Organization for Standardization ("ISO") speed information; (4) a patient ID and other information; and (5) the time and date, t, of the patient examination which produced the two-dimensional photos. In step 604, the treatment monitor checks and verifies the input data. When there are any errors detected ("Yes"), as determined in step 606, an error is returned, in step 608, to allow various types of amelioration procedures to be undertaken, including requesting additional or substitute input information. Otherwise ("No"), in step 610, the treatment monitor determines the virtual-camera parameters for each of the input images that have survived the initial check and verification step 604. In step 612, a two-dimensional image corresponding to each of the input images is generated from the time-projected three-dimensional model using the determined set of virtual-camera parameters for the corresponding input image. In step 614, each input image and corresponding model-based projected image is compared to determine a correlation coefficient, and the set of correlation coefficients are used to determine an aggregate correlation coefficient. When the determined aggregate correlation coefficient is greater than a threshold value ("Yes"), as determined in step 616, an indication that the treatment or procedure is on track, ON_TRACK, is returned in step 618. Otherwise ("No"), an indication that the treatment or procedure is off track, OFF_TRACK, is returned in step 620.

Figure 7A:
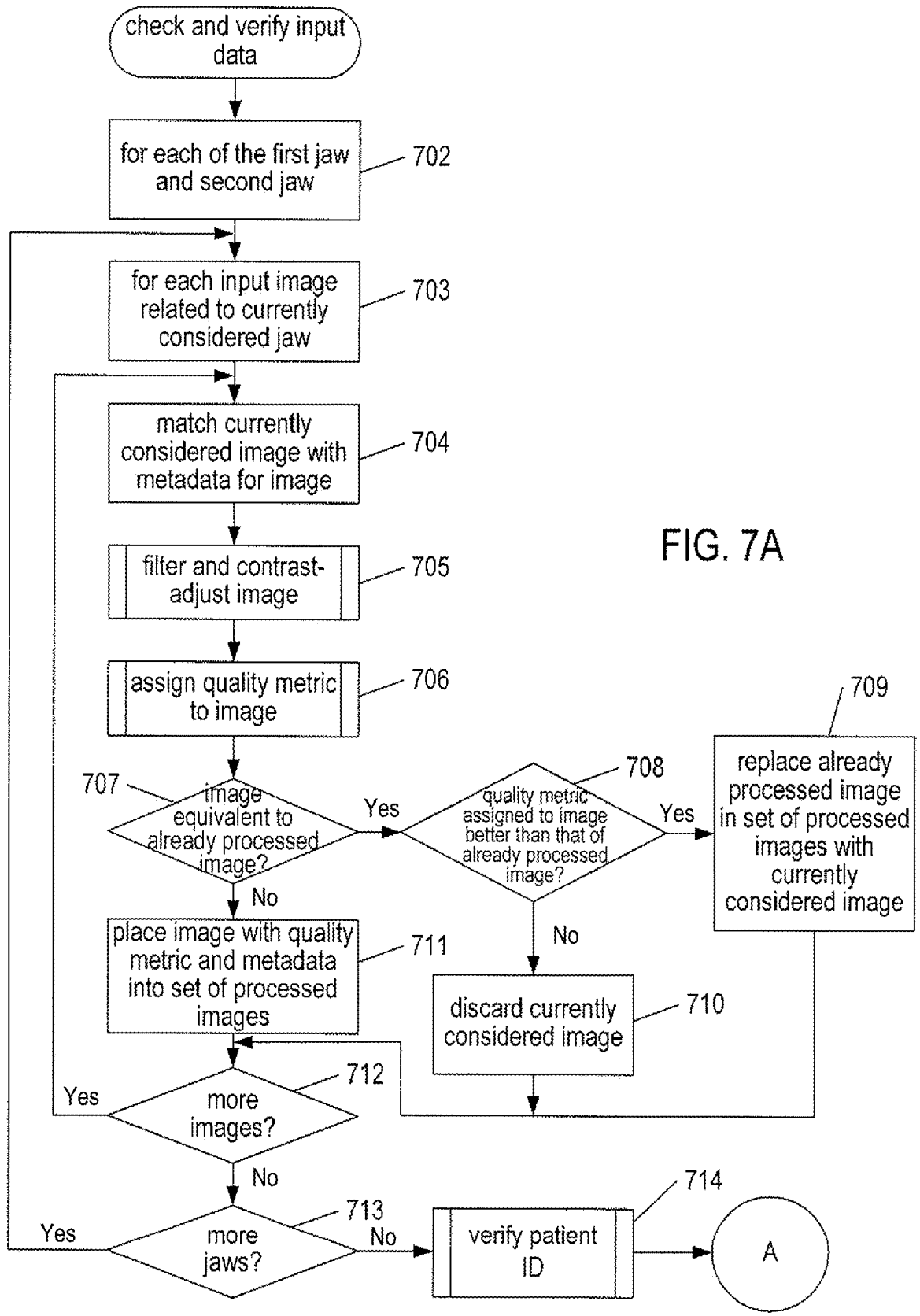
FIGS. 7A-B illustrate, using control-flow diagrams, step 604 of FIG. 6.
Figure 7B:
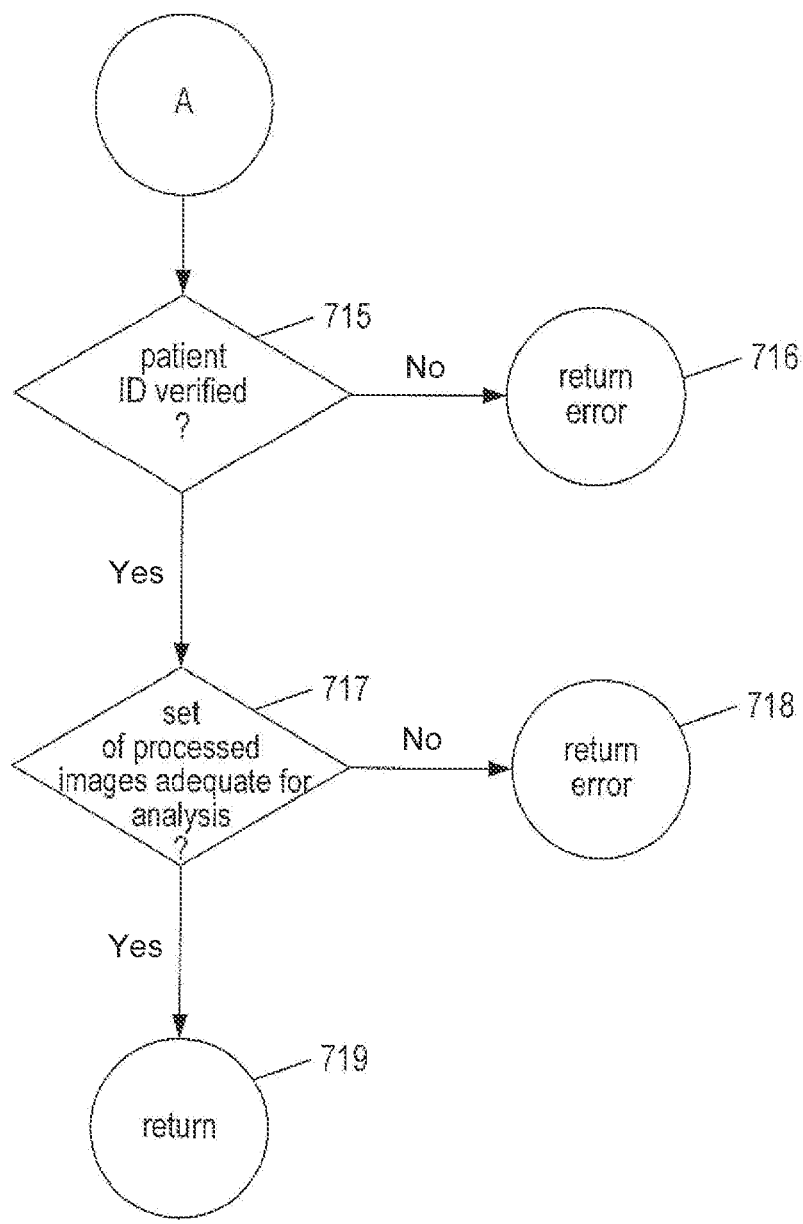

FIGS. 7A-B illustrate, using control-flow diagrams, step 604 of FIG. 6. In the nested for-loops of steps 702-713, each input image related to each of the first and second jaws of the dental patient is considered (for each input image related to currently considered jaw 703). In step 704, the check-and-verification method matches the currently considered image within the nested for-loops with the metadata extracted and collected for that image from the input data. In step 705, the check-and-verify method filters the image to remove inconsistencies and defects and, in certain cases, may expand or contract the contrast within the image, or alter the color balance, in order to adjust the image for further analysis. In step 706, the check-and-verify method carries out a qualitative analysis of the image and assigns a quality metric to the image. This quality metric reflects how well the image corresponds to the image type specified in the metadata, as well as the sharpness, clarity, and completeness of the image. When the currently considered image is equivalent to an image already processed within the nested for-loops ("Yes"), as determined in step 707, and when the quality of metric assigned to the currently considered image is better than that of the already-processed image ("Yes"), as determined in step 708, the already-processed image is replaced by the currently considered image in a set of processed images prepared by the check-and-verify method, in step 709. Otherwise, when the quality metric assigned to the currently considered image is not better than that of the already-processed image ("No"), as determined in step 708, the currently considered image is discarded, in step 710. When the currently considered image is not equivalent to an already-processed image ("No"), as determined in step 707, the currently considered image is placed, along with the computed quality metric and various metadata, into the set of processed images, in step 711 and steps 704-711 repeated if there are more images 712 ("Yes") or more jaws 713 ("Yes"). When there are no more images 712 ("No") or jaws 713 ("No"), then the process proceeds to step 714. In step 714, the check-and-verify method verifies the patient ID included in the input information. Turning to FIG. 7B, when the patient ID is verified ("Yes"), as determined in step 715, and when the set of processed images prepared in the nested for-loops of step 702-713 are deemed adequate for further analysis ("Yes"), as determined in step 717, the check-and-verify method returns, in step 719, without reporting an error condition. In this case, the set of processed images contains a single, best image of each type, and the set of images contains sufficient information to proceed with analyzing progress of the treatment. Otherwise ("No"), error conditions are reported in steps 716 and 718. Of course, the check-and-verify method may, in various implementations, carry out additional types of verification and checking of the input data, and may return addition types of error conditions when the additional checks and verifications fail.

Figure 8:
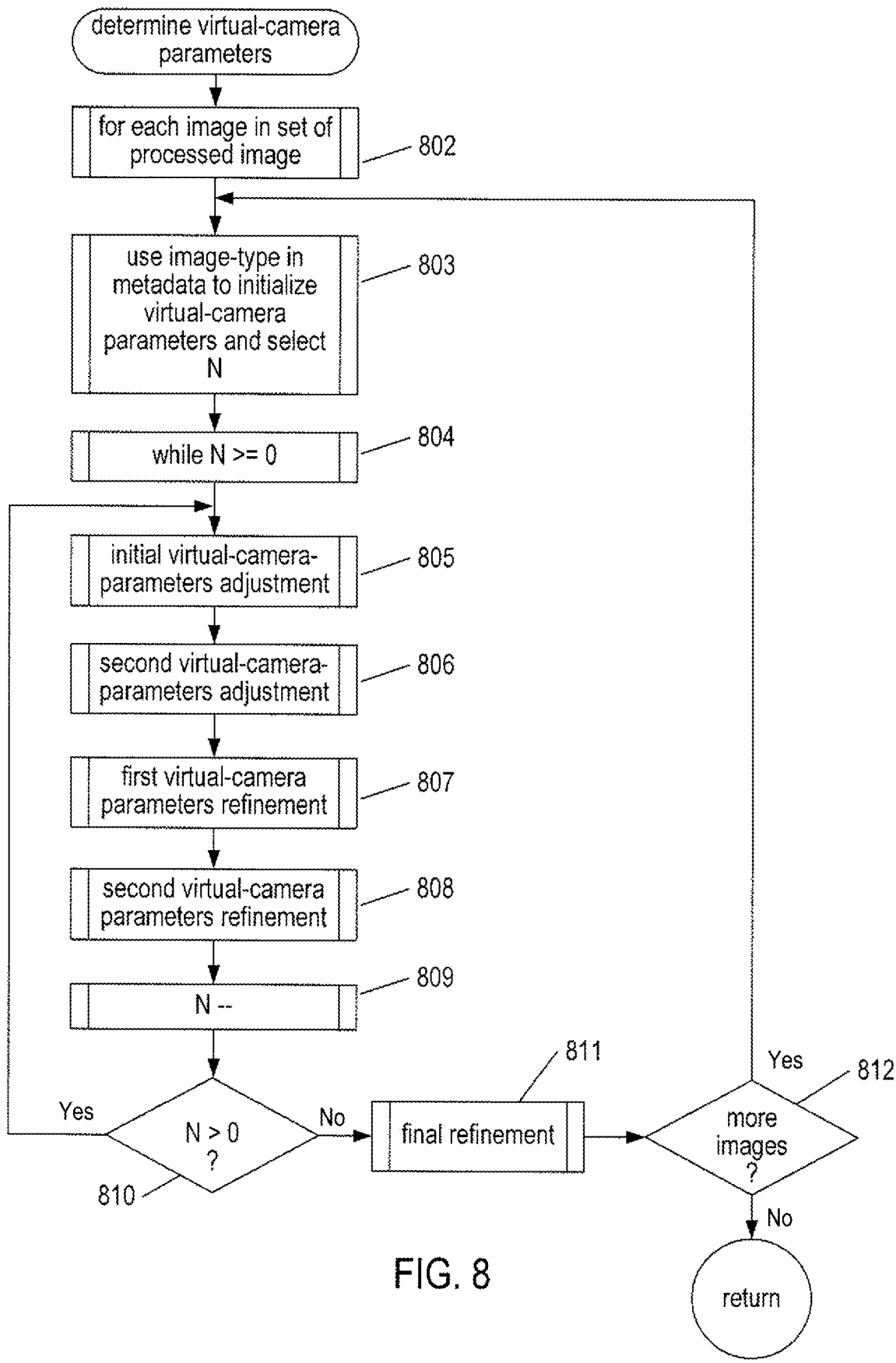
FIG. 8 provides a control-flow diagram for step 610 of FIG. 6, a virtual-camera-parameters determination method.

FIG. 8 provides a control-flow diagram for step 610 of FIG. 6, a virtual-camera-parameters determination method. In the for-loop of steps 802-812, each image in the set of processed images produced by the check-and-verify method, discussed above with reference to FIGS. 7A-B, is considered. In step 803, the method uses the metadata associated with the image, including the image type, to initialize a set of virtual-camera parameters associated with the image and to select an iteration count N. Different types of images and images with different characteristics and qualities may require a different number of adjustments and refinements. Then, in the while-loop of steps 804-810, the initial virtual-camera parameters for the image are adjusted and refined, with the while-loop iterating for N iterations. The adjustment and refinement process is non-convex, as a result of which the process does not necessarily converge. In step 805, a first virtual-camera-parameters adjustment method is invoked to make relatively coarse adjustments to the initial virtual-camera parameters. In step 806, a second virtual-camera-parameters adjustment method is invoked to more finely adjust the virtual-camera parameters for the image. In step 807, a first virtual-camera-parameters refinement method is invoked to refine the virtual-camera parameters associated with the image and, in step 808, a second virtual-camera-parameters refinement procedure is invoked to refine the virtual-camera-parameters associated with the image. In step 809, the iteration variable N is decremented. When N is greater than 0 ("Yes"), as determined in step 810, then the while-loop of steps 804-810 continues to iterate. Otherwise ("No"), in step 811, a final refinement method is called to adjust the virtual-camera parameters for the image. Note that, through the various steps and iterations, the virtual-camera parameters associated with an image are generally continuously adjusted and refined towards a set of virtual-camera parameters that best estimates the position, orientation, and focal length of the dental practitioner's camera, with respect to the patient's teeth, used to initially capture the input image. When there are more images ("Yes"), as determined in step 812, then the while-loop of steps 803-811 continues to iterate. When there are no more images ("No"), the while-loop of steps 803-811 stops iterating.

Figure 9:
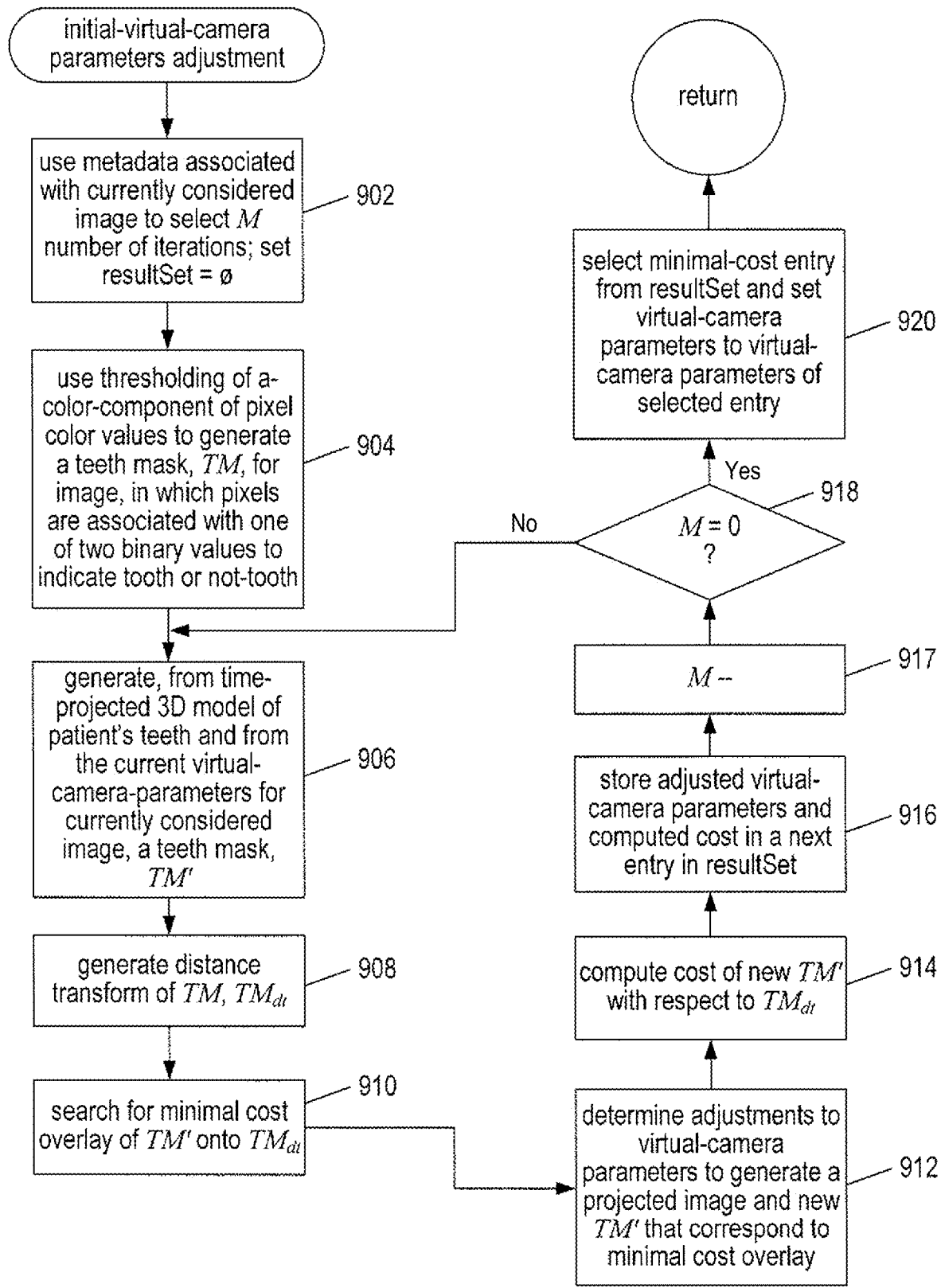
FIG. 9 provides a control-flow diagram for the initial virtual-camera-parameters adjustment method invoked in step 805 of FIG. 8.

FIG. 9 provides a control-flow diagram for the initial virtual-camera-parameters-adjustment method invoked in step 805 of FIG. 8. In step 902, the method uses metadata associated with the image to select a value of an iteration variable M, in similar fashion to the selection of a value for the iteration variable N in step 803 in FIG. 8, and a set of entries resultSet is initialized to be empty. In step 904, the initial virtual-camera-parameters-adjustment method applies thresholding to each pixel color/intensity value within the image to generate a teeth mask, TM, for the image. When the pixels are encoded in the Lab color model, the a color component of the pixel color/intensity value is thresholded. The Lab color model is a color-opponent space with dimension L for lightness and color-opponent dimensions a and b, based on nonlinearly compressed color space coordinates, such as International Commission on Illumination ("CIE") XYZ color space coordinates. When other color-model encodings are used for pixel colors and intensities, other components or values derived from one or more components of the pixel color/intensity values are thresholded. The elements corresponding to image pixels in the teeth mask TM are associated with one of two binary values to indicate whether the pixel or element corresponds to a tooth region or a non-tooth region within the image. In step 906, a similar teeth mask, TM', is generated from the time-projected three-dimensional using the current virtual-camera parameters for the two-dimensional input image from which teeth mask TM was produced. In step 908, a distance transform of teeth mask TM, $TM_{dt}$, is generated. In step 910, the method searches for a minimal-cost overlay of teeth mask TM' onto the distance transform of TM, $TM_{dt}$, with the search carried out over various rotations and scale factors of the teeth mask TM' with respect to the distance transform $TM_{dt}$. In step 912, adjustments to the virtual-camera parameters for the currently considered two-dimensional image are computed in order to generate a new two-dimensional image from the three-dimensional model and a new teeth mask TM' that correspond to the minimal-cost overlay of the previously computed TM' onto $TM_{dt}$. In step 914, a cost of the new TM' teeth mask with respect to $TM_{dt}$ is computed. The adjusted virtual-camera parameters and computed cost, obtained in steps 912 and 914, are stored as a next entry in the set variable resultSet, in step 916. In step 917, iteration variable M is decremented. When M is still greater than 0 ("No"), as determined in step 918, control returns to step 906 for an additional iteration of the virtual-camera-parameters adjustment. Otherwise ("Yes"), in step 920, the minimal-cost entry in resultSet is selected and the virtual-camera parameters associated with the two-dimensional image are set to the virtual-camera parameters in the selected entry.

Figure 10A:
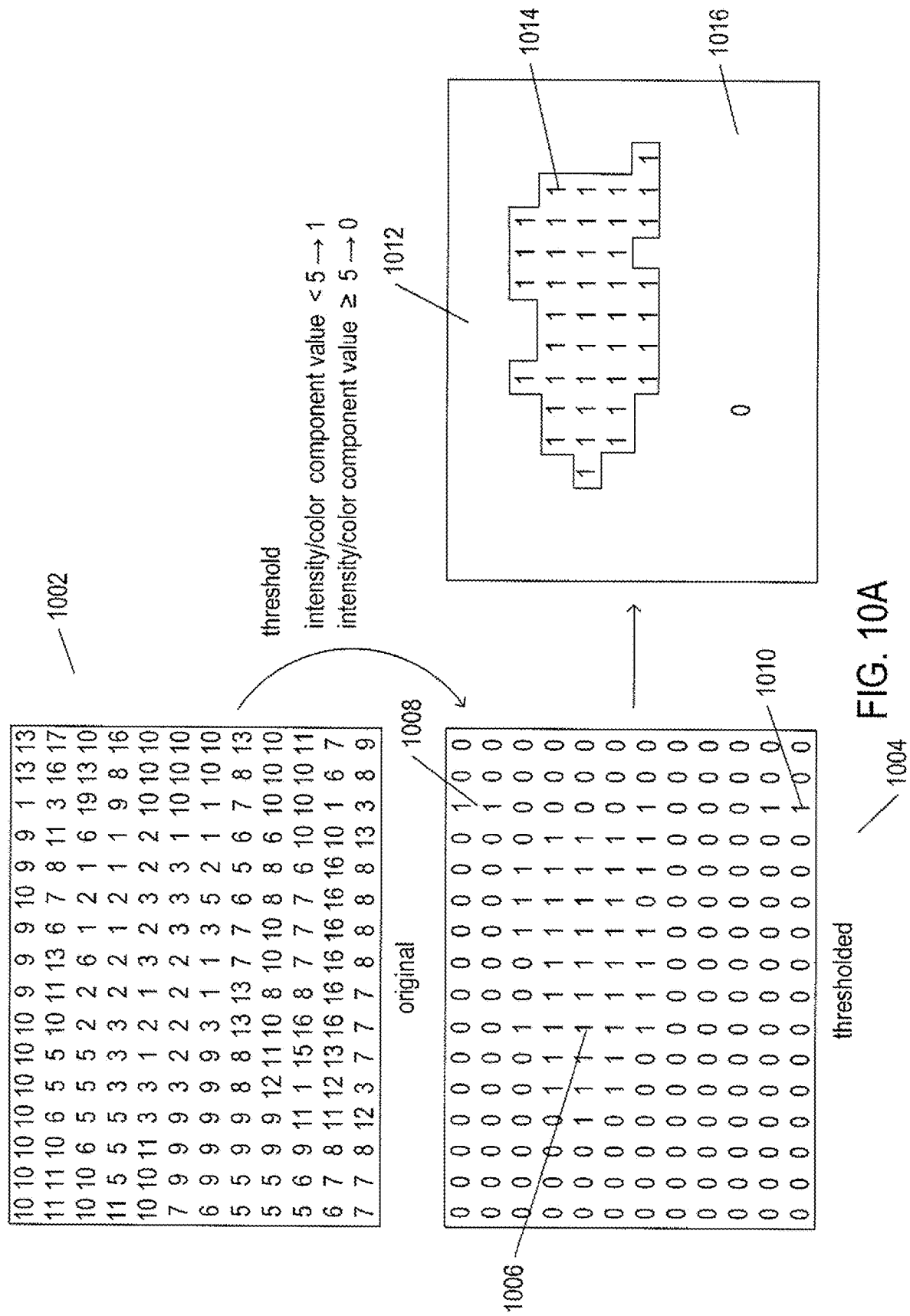
FIGS. 10A-C provide additional details with regard to steps 904, 908, and 912 of FIG. 9.
Figure 10B:
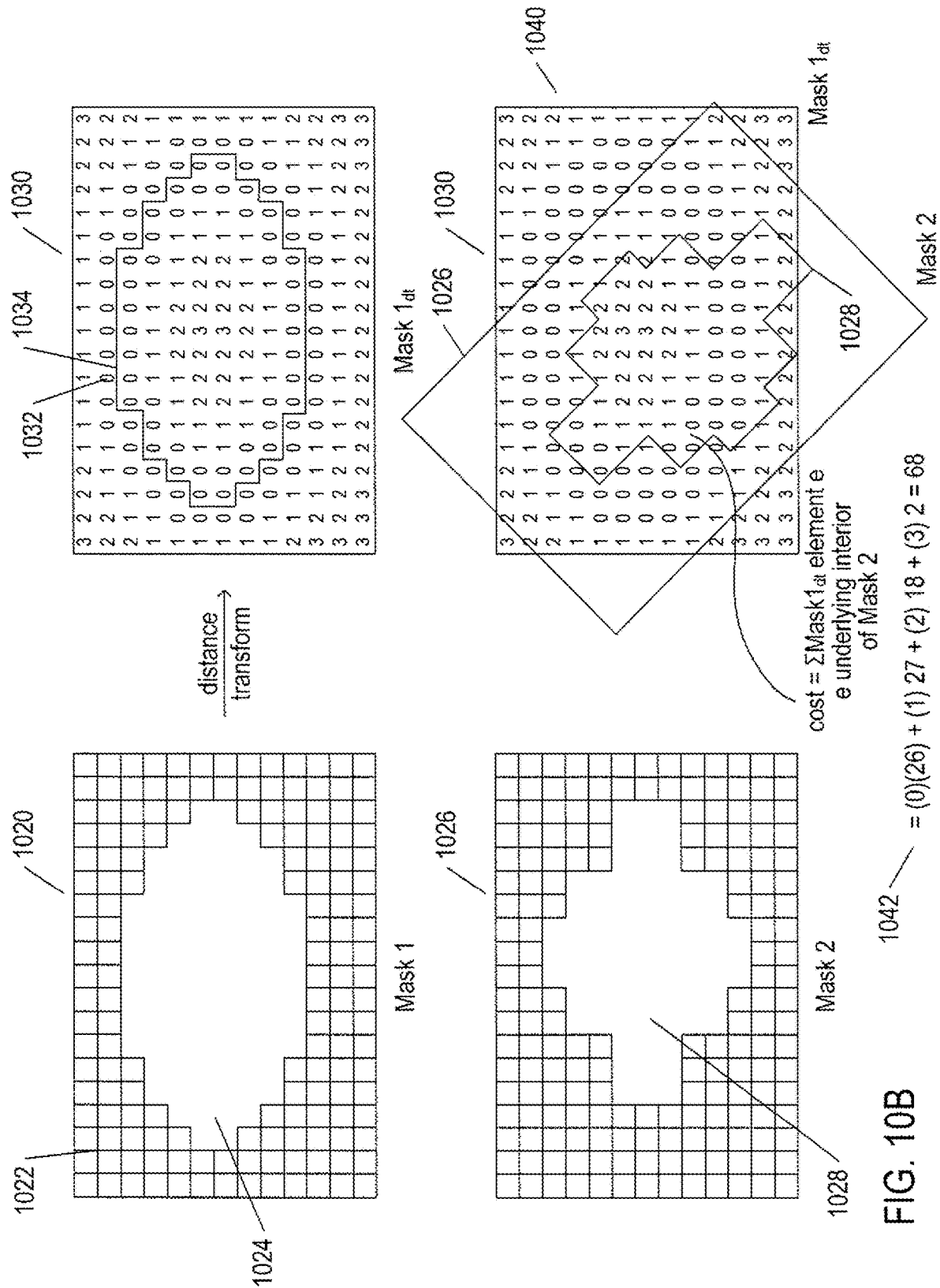
Figure 10C:
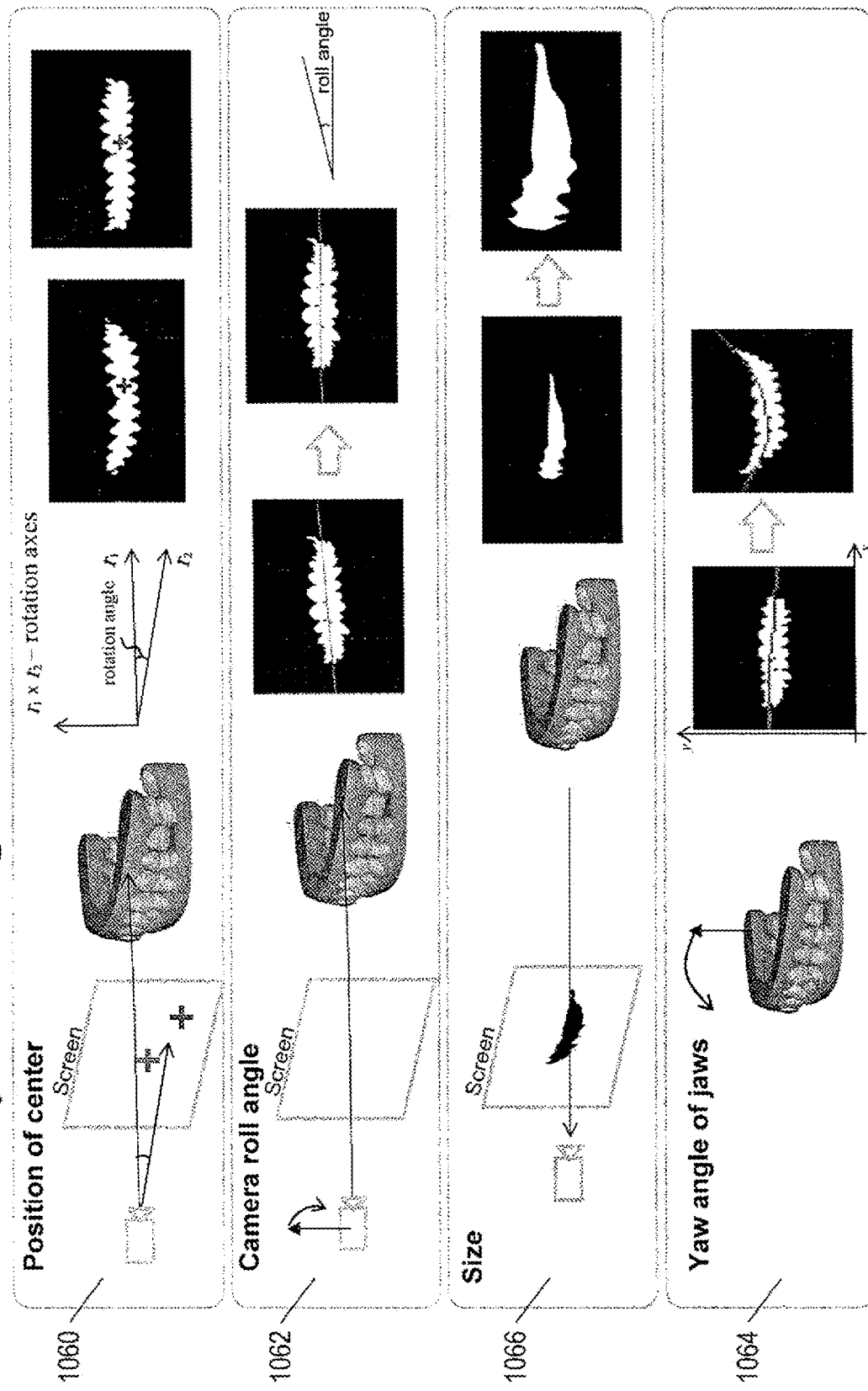

FIGS. 10A-C provide additional details with regard to steps 904, 908, and 912 of FIG. 9. FIG. 10A illustrates the thresholding step 904 in FIG. 9. A small hypothetical portion of an image 1002 is shown as the original image in FIG. 10A. Each pixel in the original image is shown to have an intensity/color-component value. In the thresholding operation, those pixels with intensity/color-component values less than a threshold value, in the current hypothetical case 5, are assigned to the value 1 and all other pixels are assigned to the value 0. In one implementation, the threshold value is determined using well-known Otsu's well-known thresholding method, in which image pixels are partitioned into two classes on the assumption that the intensity-value distribution of the pixels can be modeled as a bi-modal distribution. Otsu's method seeks a threshold that minimizes the intra-class variance, which is the weighted sum of the intensity-value variances of the two classes. Pixels assigned the value 1 are considered to be tooth-region pixels and the other pixels are considered to be non-tooth-region pixels. Thus, in the thresholded image 1004, a small interior region 1006 corresponds to teeth. In addition, there are two small, teeth-like regions 1008 and 1010 adjacent to the edge of the image. In a next step, any of the teeth regions adjacent to the edge are backfilled with 0 values, since the teeth should not be at the borders of the photographs according to the procedures and protocols for taking photographs by the dental practitioner. A final step, not shown in FIG. 10A, reconsiders 0-backfilled regions to ensure that teeth-like regions have not been inadvertently back filled. The result of the next step is a tooth mask 1012 with an interior tooth-corresponding region 1014 with 1-valued pixels and an outer region with 0 value corresponding to non-tooth regions 1016.

FIG. 10B illustrates the computation of a distance transform of one mask in computing the cost of an overlay of a second mask onto this distance transform. A first mask 1020 is shown in FIG. 10B. The outer portion of the mask 1022 is shown in grid lines and has one of two binary values and an interior portion of the mask 1024 is shown without grid lines and each element or pixel in the interior portion has the other of the two binary values. A second mask 1026 is shown below the first mask. Note that the interior region of the second mask 1028 is differently shaped in size than the interior region 1024 of the first mask 1020. A distance transformation transforms the first mask 1020 into a first-mask distance transform 1030. In this transformation, the value of the elements or pixels in the first mask are replaced by the distance, in elements or pixels, that needs to be traversed from the element to the boundary between the outer and inner portions of the first mask. For example, from pixel 1032, no other pixels or elements need to be traversed in order to reach the boundary 1034 of the inner and outer mask regions, and therefore pixel or element 1032 has value 0 in the distance transform. Many different types of distance metrics can be used, including Euclidian distance, city-block distance, and other such distances. In the right-hand corner of FIG. 10B, the second mask 1026 is rotated with respect to the distance transform of the first mask 1030 and overlaid on top of the distance transform of the first mask to produce an overlay 1040. In the search for the minimal cost or best overlay of TM' with respect to $TM_{dt}$, in step 910 of FIG. 9, a state space search is carried out in which various possible rotations and translations of the second mask are considered with respect to the distance transform of the first mask for various different scales, or sizings, of the second mask. The cost for a particular overlay, such as overlay 1040, is computed as the sum of the values of the elements in the distance transform underlying the interior region 1028 of the second mask, as indicated 1042 in FIG. 10B below the overlay 1040.

FIG. 10C illustrates certain of the adjustments of the virtual-camera parameters in order to create a projected image from which a new TM' that corresponds to a minimal-cost overlay of the TM' over the distance transform can be prepared. The adjustments include adjusting the position or center of the virtual camera 1060, adjusting the roll and yaw angles of the virtual camera 1062 and 1064, and adjusting the focal length or distance of the virtual camera from the surface of the 3D model 1066. The adjustments alter one or more of the shape, size, and orientation of the inner teeth region of the previous TM' so that a minimal-cost overlay of the new TM' is obtained. First, the camera is rotated 1060 so that the center of mass of the two masks, TM and TM', coincide. For this purpose, two vectors are constructed in a coordinate system with an origin coincident with the camera position. The two vectors include a first vector that describes the position of the TM center of mass and a second vector that describes the position of the TM' center of mass. The camera is rotated about a rotation axis coincident with the vector obtained as the cross-product of the first and second vectors. The camera roll angle is adjusted 1062, for front or side views only, by fitting straight lines through both teeth masks and rotating camera around the z axis (346 in FIG.

3B) so that the lines are parallel. To modify the area of mask TM' 1066, the camera is moved closer or further from the three-dimensional model. A coefficient K controls this movement. When K>1, the camera is moved away from the three-dimensional model. Otherwise, the camera is moved closer to the three-dimensional model. Coefficient K is found using an empirical formula $$K = 1 + \frac{1}{2}\left(\sqrt[4]{\frac{|TM'|}{|TM|}} - 1\right),$$

where |TM| and |TM'| are the areas, in pixels, of the two masks TM and TM', respectively. Adjustment of the yaw angle 1064 is carried for front or side views, but not for occlusal views. The yaw angle is computed using parameters of parabolas that are fitted through masks and an empirical formula for computing of the yaw angle in radians, provided below:

$$y = a_1 x^2 + b_1 x + c_1, \text{ where } x, y \in TM,$$
$$y = a_2 x^2 + b_2 x + c_2, \text{ where } x, y \in TM',$$
$$\text{yaw angle} = \frac{1}{2}\sqrt{|a_1 - a_2|} * \text{sign}(a_1 - a_2).$$

Figure 11:
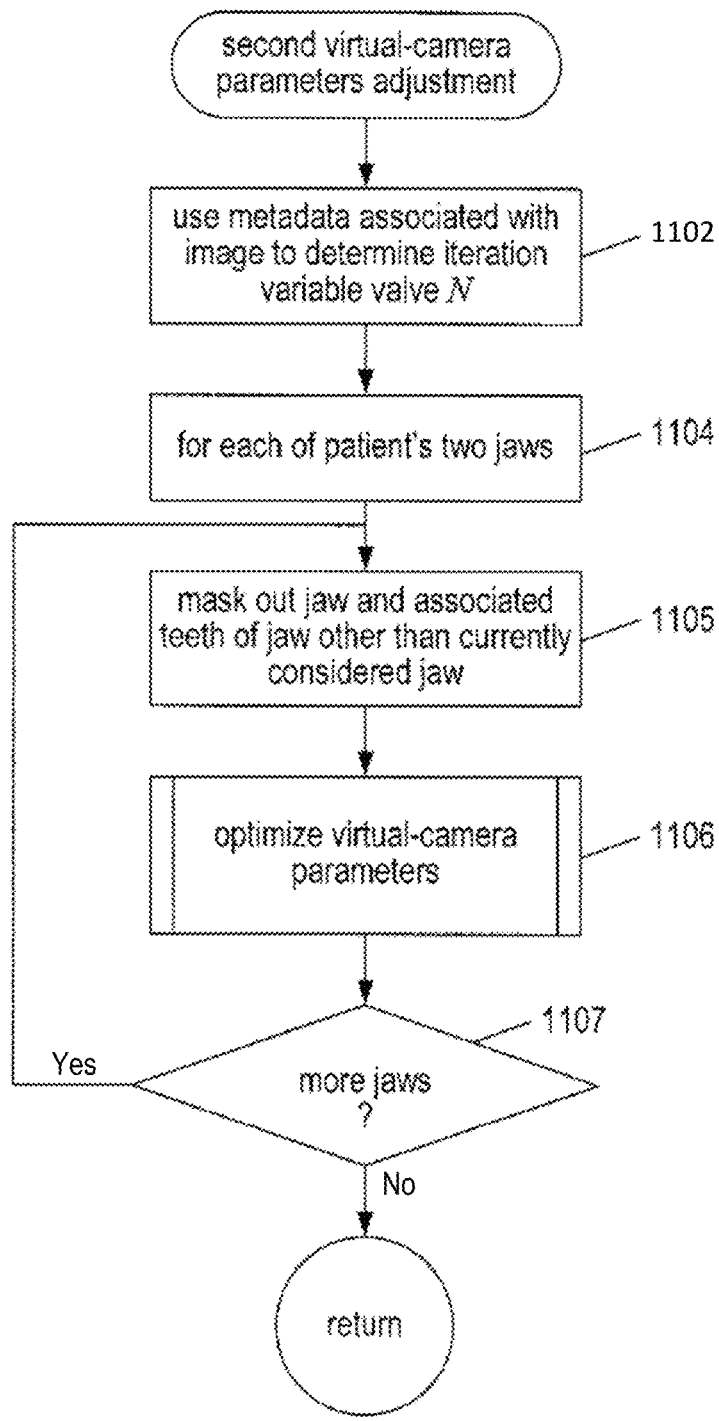
FIG. 11 shows the second virtual-camera-parameter's adjustment method invoked in step 806 of FIG. 8.

FIG. 11 shows the second virtual-camera-parameters adjustment method invoked in step 806 of FIG. 8. In step 1102, the metadata associated with the image is used to determine a value for an iteration variable N. Then, in the for-loop of steps 1104-1107, each of the two jaws of the dental patient, and their associated teeth, are considered. In step 1105, the jaw and associated teeth that are not currently considered are removed from the image and from current consideration. Then, in step 1106, the virtual-camera parameters associated with the image are optimized for that portion of the image corresponding to the currently considered jaw and associated teeth. When there are more jaws ("Yes"), the for-loop of steps 1104-1107 continues iterating. When there are no more jaws ("No"), the for-loop of steps 1104-1107 stops iterating.

Figure 12:
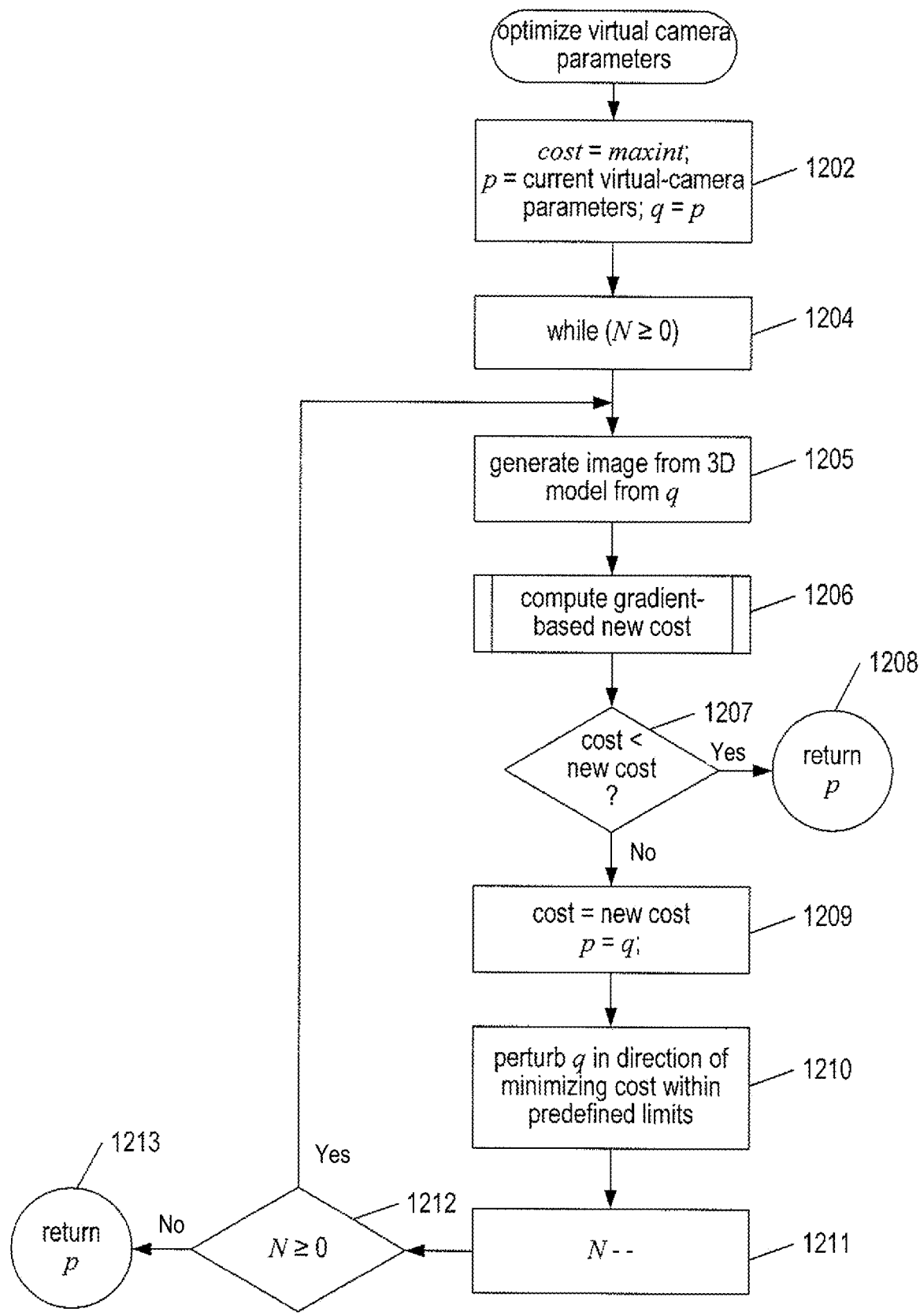
FIG. 12 provides a control-flow diagram for the optimization step 1106 in FIG. 11.

FIG. 12 provides a control-flow diagram for the optimization step 1106 in FIG. 11. In step 1202, an initial value of a variable cost is set to a large number and the variables p and q are both set to the current virtual-camera parameters. Then, in the while-loop of steps 1204-1212, an optimization method is used to find an optimized set of virtual-camera parameters for the currently considered image. The while-loop iterates over a number of iterations indicated by the iteration variable N, determined in step 1102 of FIG. 11. In step 1205, a two-dimensional image is generated from the three-dimensional model using the virtual-camera parameters q. In step 1206, a gradient-based cost is computed for this generated two-dimensional image with respect to the currently considered input image. When the new gradient-based cost is greater than the value stored in the variable cost 1207 ("Yes"), the virtual-camera parameters p are returned, in step 1208, since these parameters correspond at least to a local minimum discovered in the previous iteration of the while-loop. Otherwise ("No"), the value of the variable cost is set to the new cost computed in step 1206 and the virtual-camera parameters p are set to q, in step 1209. In step 1210, the virtual-camera parameters q are perturbed in the direction of minimizing the cost within certain predefined limits. In step 1211, the iteration variable N is decremented. When the iteration variable N is greater than or equal to 0 ("Yes"), as determined in step 1212, control returns to step 1205 for another iteration of the while-loop. Otherwise ("No"), the current virtual-camera parameters p are returned, in step 1213. The optimization approach illustrated in FIG. 12 is used subsequently for numerous steps, described below.

In one implementation, a Nelder-Mead downhill simplex optimization method is employed, with seven dimensions, including three rotations, three translations, and the virtual-camera view angle. In this method, a simplex with n+1 vertices in n dimensions, for a problem in n variables, is used, with test points corresponding to the vertices. The test points are replaced in a way that conserves the volume of the simplex but moves and deforms the simplex toward a local optimum. There are many variations of the Nelder-Mead downhill simplex optimization method, and many additional optimization methods that may be employed to optimize the virtual-camera parameters.

Figure 13A:
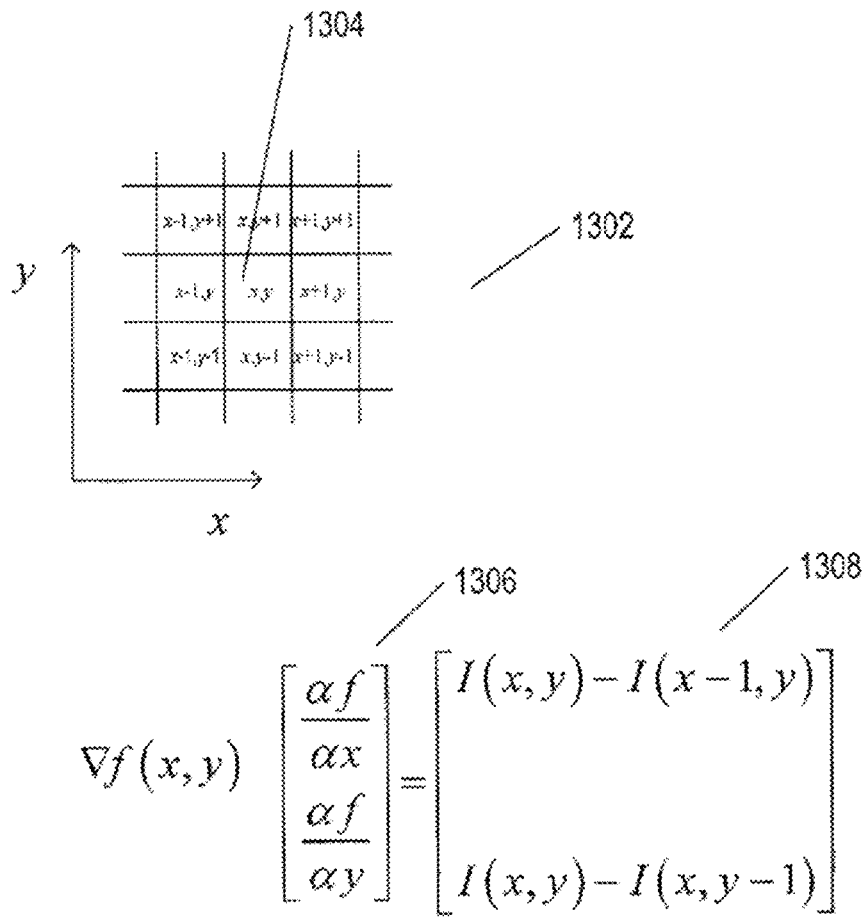
Figure 13A:
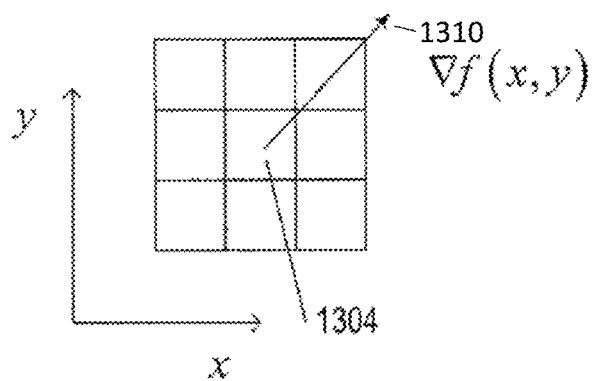
Figure 13B:
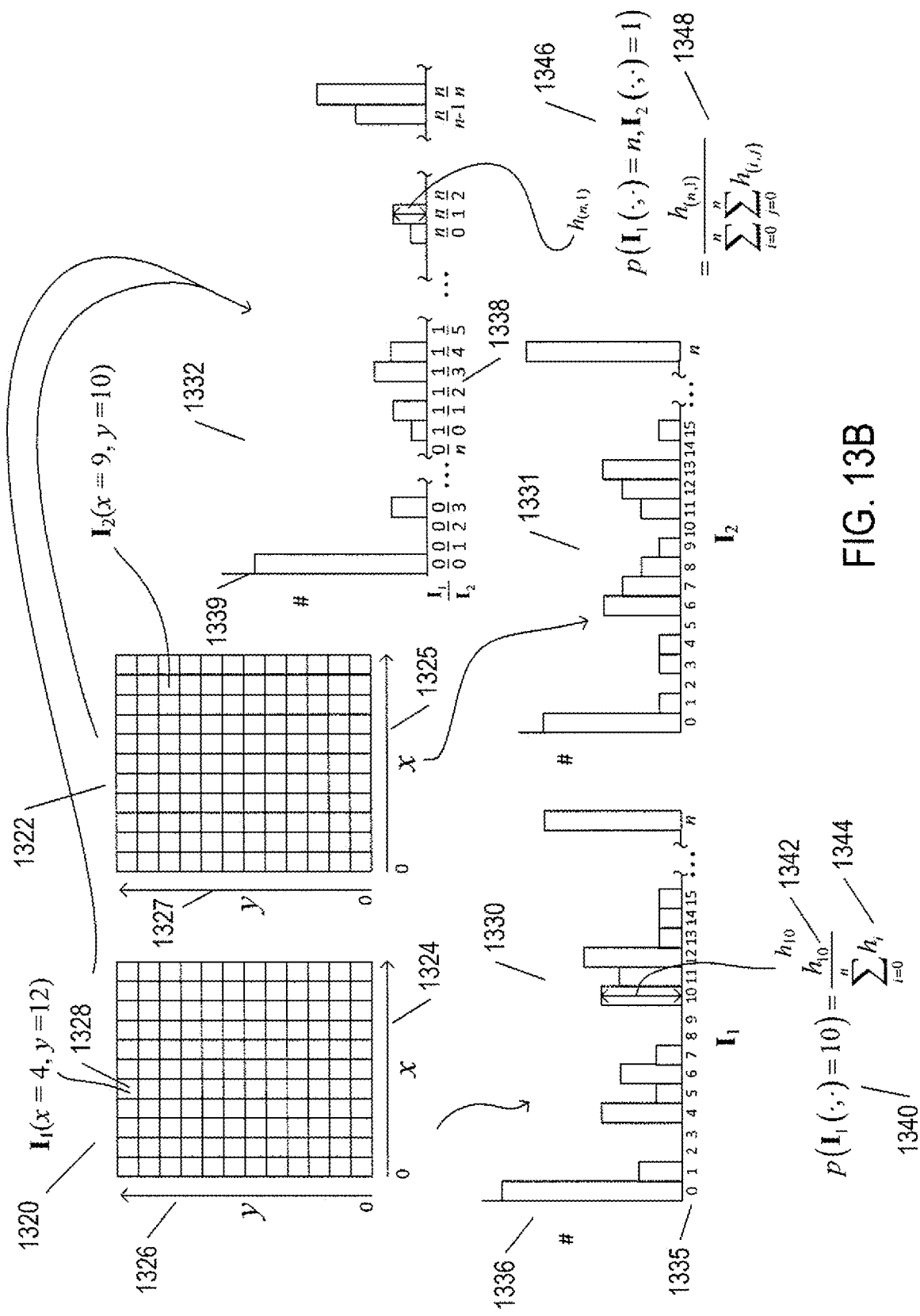

FIGS. 13A-C illustrate computation of a gradient-based cost. A small portion of the pixels in image 1302 are shown at the top of FIG. 13. The pixels are cells within a grid, such as the cell 1304 with grid coordinates (x,y). The gradient at the location of a pixel (x,y) in an image $f$ is a vector 1306 that can be estimated from a discrete pixel-intensity computation 1308. Thus, the gradient vector $\nabla f(x,y)$ can be computed for each pixel or element of an image. The gradient vector 1310 for the pixel $f(x,y)$ 1304 is shown as an example of a gradient associated with a pixel element. By computing the gradient at each pixel in an image, with different methods used to compute certain of the boundary-pixel gradient vectors, an image can be transformed into a vector field. Two images can be compared by computing a comparison value based, in part, on a comparison of the gradient-vector fields of the two images.

FIG. 13B illustrates generation of histograms for the intensity values of two images that are to be compared. The probability that a randomly selected pixel from the images has a particular intensity value can be computed from pixel-intensity histograms. In FIG. 13B, two images 1320 and 1322 are shown. Image 1320 is referred to as image $I_1$ and image 1322 is referred to as image $I_2$. As usual, the pixels within the images are shown as rectangular or square cells and the cells are associated with coordinates with respect to x 1324-1325 and y 1326 and 1327 axes. Each pixel is associated with an intensity value. The intensity value may have different components, depending on the color model used to encode the colors and intensities of the pixel, or may be associated with a single intensity derived from the multiple color/intensity components associated with a pixel. In one implementation, each pixel is associated with an averaged intensity that represents the average of three color-channel intensities. The intensity for a pixel with coordinates (x,y) of image $I_1$ is denoted as $I_1(x,y)$. For example, the intensity of cell 1328 is $I_1(4, 12)$. Histograms 1330-1332 are be prepared from the intensity values of the pixels of the individual images $I_1$ and $I_2$ and for the combination of the two images. For example, histogram 1330 is prepared from image $I_1$. The horizontal axis 1335 of the histogram is incremented in increasing intensity values and the vertical axis 1336 represents the number of pixels in the image having a particular intensity value. Of course, the histograms may be computationally represented by arrays of pixel counts indexed by intensity values. Histogram 1331 is prepared, in similar fashion, from image $I_2$ 1322. The joint histogram 1332 is a histogram showing the number of matching or aligned pixels, in the two images $I_1$ and $I_2$, having a particular ordered pair of intensity values. The horizontal axis 1338 of the joint-image histogram 1332 is incremented in pairs of intensity values and the vertical axis 1339 represents the number of equivalent, aligned pixel pairs having a particular ordered pair of intensities. One pixel of each pair of pixels is selected from the first of the two images and the other pixel of each pair of pixels is selected from the second of the two images, with both pixels of each pair having the same (x,y) coordinates. The histograms can be thought of as discrete probability distributions. For example, the probability that a randomly selected pixel from image $I_1$ has the intensity value 10 1340 can be computed as the number of pixels in image $I_1$ with intensity value 10 1342 divided by the number of pixels in image $I_1$ 1344. In similar fashion, the probability that two aligned and matching pixels and images $I_1$ and $I_2$ have a particular ordered pair of intensity values 1346 is computed as the ratio of the number of pixels of the two images having the ordered pair of intensity values divided by the total number of the pixels in each of the two images 1348.

As shown in FIG. 13C, the intensity probabilities computed for randomly selected pixels of the two images $I_1$ and $I_2$ and joint intensity probabilities for pairs of matching pixels selected from the two images can be represented by alternative, simpler notation 1350. Using this notation, the expressions 1352 show calculation of the Shannon entropy $H_1$, $H_2$, and $H_{1,2}$ for image $I_1$, image $I_2$, and the combination of images $I_1$ and $I_2$, respectively. The mutual information for the two images $I_1$ and $I_2$, $MI(I_1, I_2)$ is then computed, as shown in FIG. 13 1354 from the entropies computed in expressions 1352. A variety of alternative expressions for $MI(I_1, I_2)$ in terms of entropies, joint entropies, and conditional entropies can instead be used to compute $MI(I_1, I_2)$. A cost function that represents a comparison value for two images $I_1$ and $I_2$ is then computed as the negative of the mutual information of the two images multiplied by a computed value $G(I_1, I_2)$, as shown in expression 1356. The computed value $G(I_1, I_2)$ is, as shown in expression 1358, computed as the sum of a function $f()$ computed over all of the pixels of the images. The function $f()$ takes, as arguments, the gradients computed for each pixel (x,y) for the two images and the value in the teeth mask computed for the first of the two images. As shown in expression 1360, the function $f()$ has the value $\cos(a, b)*\sqrt{\sqrt{\min(|a|,|b|)}}$ when the pixel to which the function is applied is a member of a teeth region in the mask and is otherwise 0. The cost-function value is minimized, by optimization methods discussed above with reference to FIG. 12.

Figure 14:
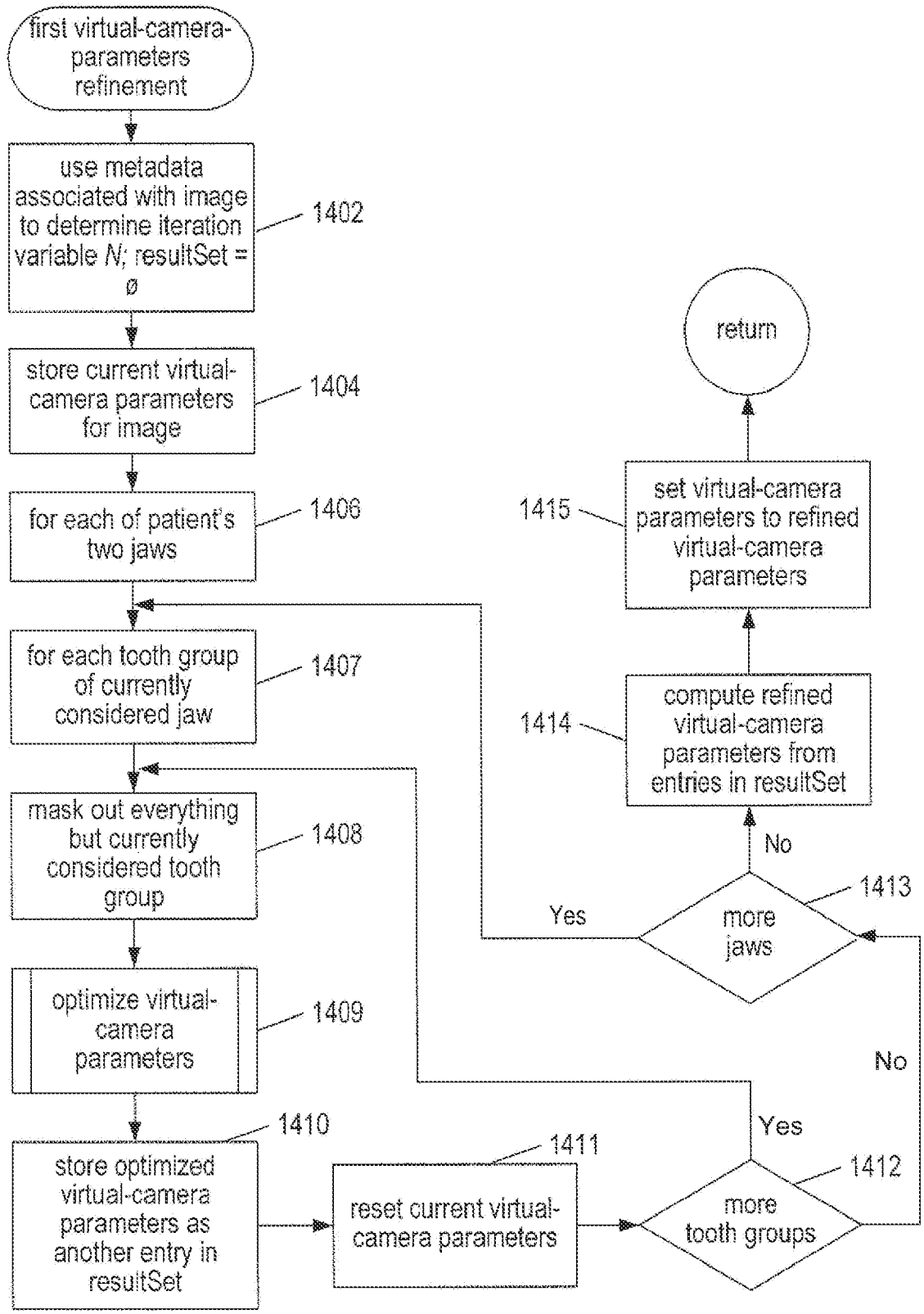
FIG. 14 provides a control-flow diagram for the first virtual-camera-parameters refinement method called in step 807 of FIG. 8.

FIG. 14 provides a control-flow diagram for the first virtual-camera-parameters refinement method called in step 807 of FIG. 8. In step 1402, the metadata associated with the currently considered input image is used to determine the value for an iteration variable N and a set variable resultSet is initialized to be empty. In step 1404, the current virtual-camera parameters for the image are stored. In an outer for-loop of steps 1406, each of the patient's two jaws and associated teeth are separately considered in two iterations. In the inner for-loop of steps 1407-1411, each tooth group of the currently considered jaw is considered 1407. The rest of the image other than the currently considered tooth group is masked out of the image, in step 1408. Then, in step 1409, an optimization procedure equivalent to the optimization procedure discussed above with reference to FIG. 12 is used to optimize the virtual-camera parameters for the currently considered input image. In step 1410, the optimized virtual-camera parameters are stored as a next entry in the set resultSet produced by the inner and outer for-loops of steps 1406-1413. Finally, in step 1411, the current virtual-camera parameters are reset to the stored virtual-camera parameters, stored in step 1404 and repeated for more tooth groups 1412 ("Yes"). If there are no more tooth groups ("No"), at 1413 a decision is made as to whether there are any more jaws to consider. If there is a jaw to consider ("Yes"), the for-loops of steps 1406-1413 continue iterating. Following termination of the two nested loops in steps 1406-1413 when there are no more tooth groups 1412 ("No") and no more jaws 1413 ("No") to consider, a refined virtual-camera parameter is computed from the entries stored in the set resultSet by the two nested loops, in step 1414. This computation may involve illuminating outlying results from the results set and then averaging or using a weighted average on the remaining results of the results set. Then, in step 1415, the virtual-camera parameters for the currently considered input image are set to the refined virtual-camera parameters determined in step 1414.

Figure 15:
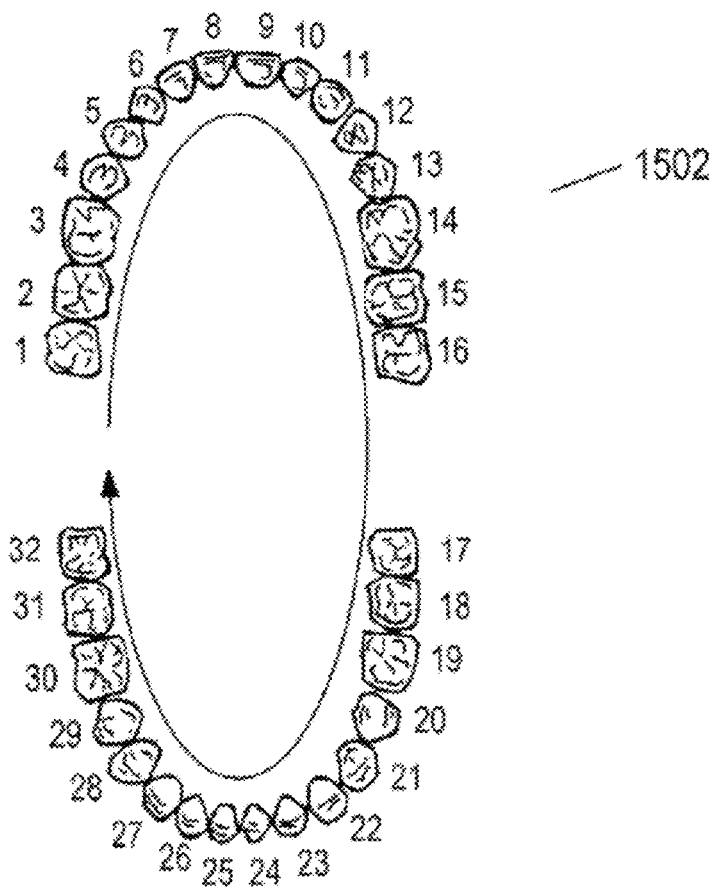
FIG. 15 illustrates examples of the tooth groups over which the inner loop of the method illustrated in FIG. 14 iterates.

FIG. 15 illustrates examples of the tooth groups over which the inner loop of the method illustrated in FIG. 14 iterates. At the top of FIG. 15, a chart indicating the universal numeric code for human teeth is provided 1502. Example tooth groups are shown below the chart, such as example tooth group 1504 consisting of the four teeth 7, 8, 9, and 10. Various different partitionings of teeth into tooth groups can be employed for deriving the multiple iterations of the inner loop of the nested for-loops discussed above with reference to FIG. 14.

Figure 16:
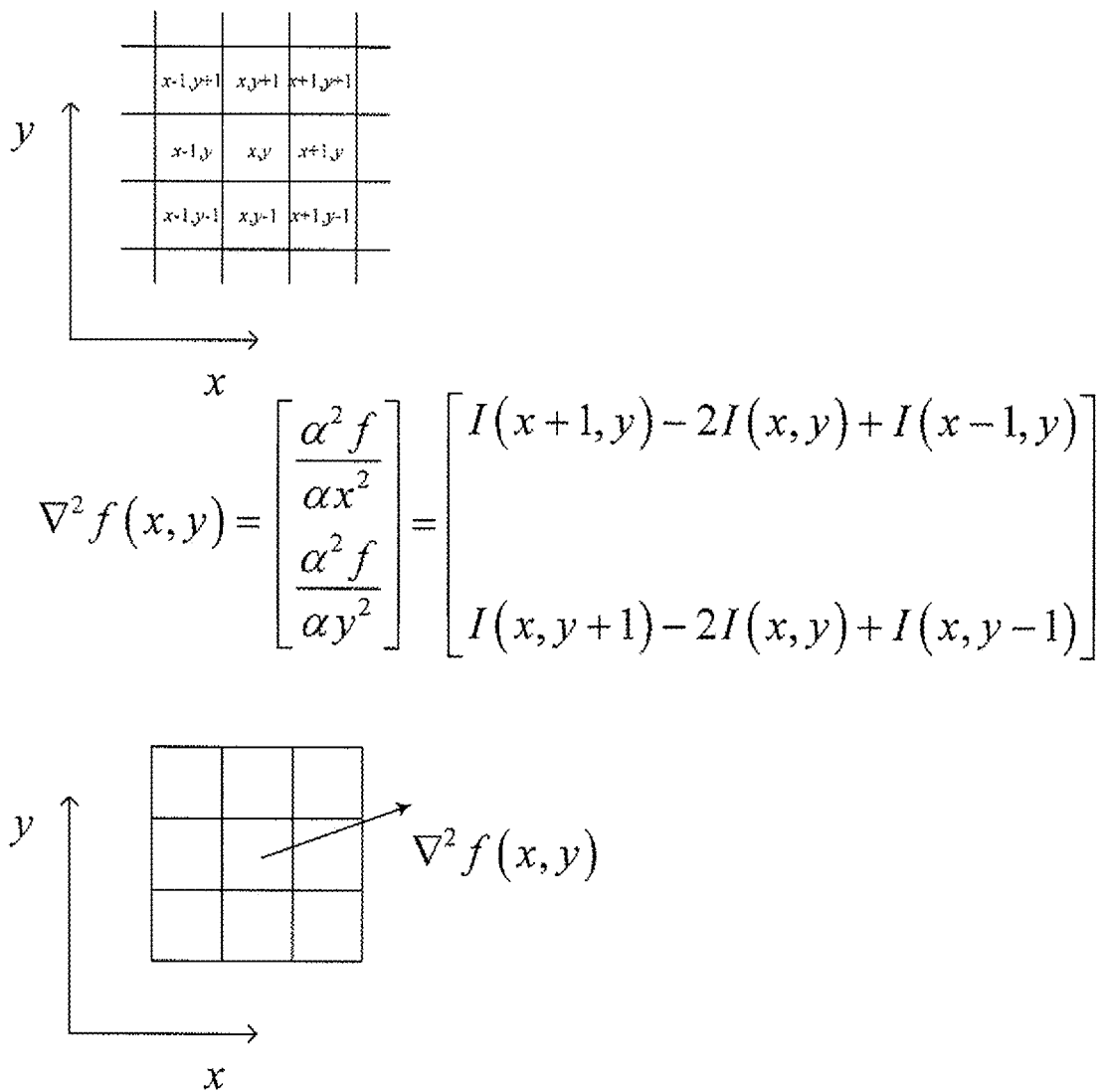
FIG. 16 illustrates, using the same illustration conventions as used in FIG. 13, computation of the Laplacian vectors for image elements and generation of a Laplacian-vector field.

The current discussion has been proceeding through the steps shown in FIG. 8. The second virtual-camera-parameters refinement method, invoked in step 808, uses an optimization method similar to that discussed above with reference to FIG. 12 on the full complement of teeth. The final refinement method, invoked in step 811 of FIG. 8, is similar to the method invoked in step 808, with the exception that the cost is computed from a consideration of the second derivatives of the images at the image elements, or Laplacian vectors, rather than the first derivatives, or gradient vectors. FIG. 16 illustrates, using the same illustration conventions as used in FIG. 13, computation of the Laplacian vectors for image elements and generation of a Laplacian-vector field.

Figure 17A:
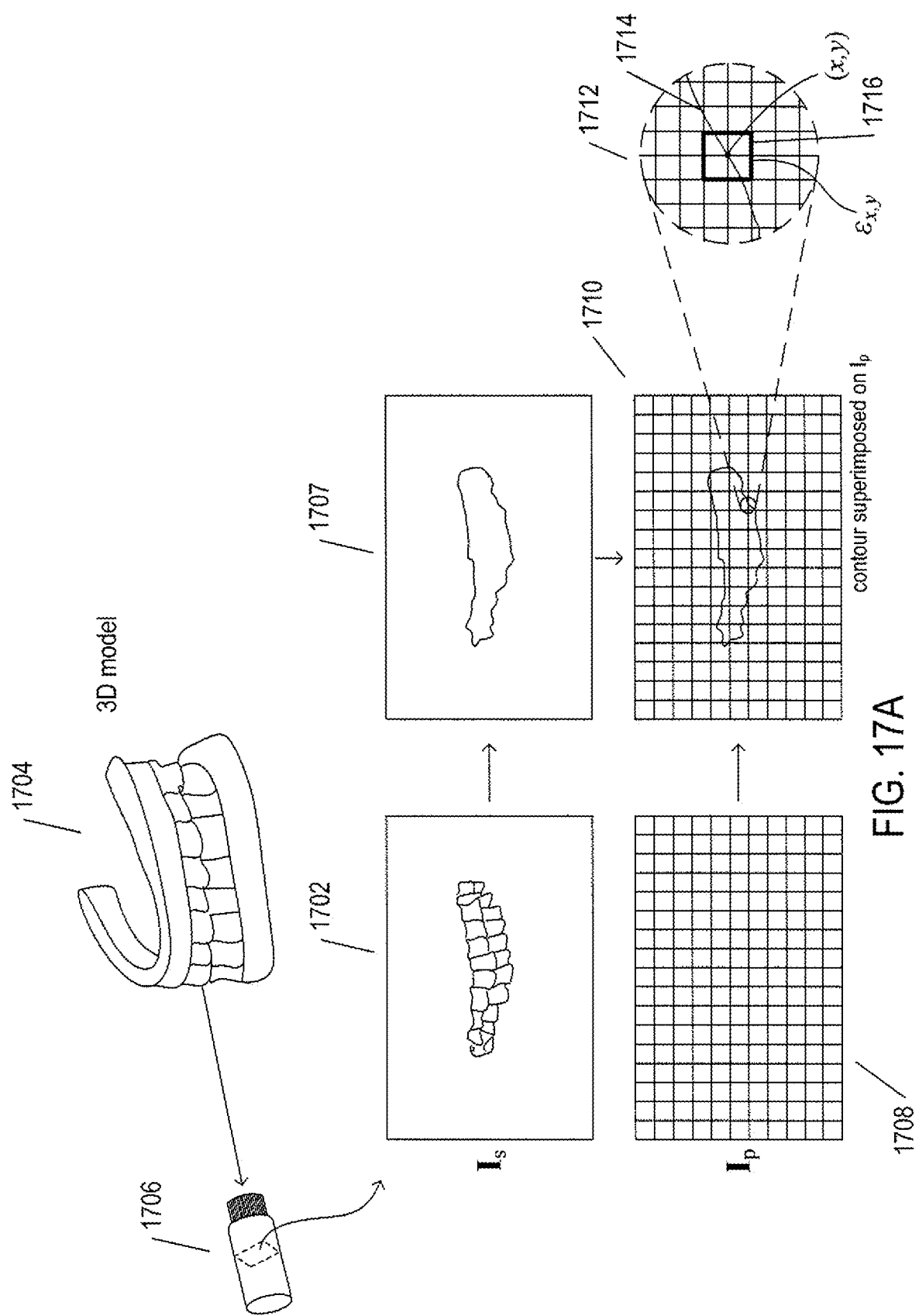

As discussed above with reference to FIGS. 5D and 9, once all the input images are associated with finally refined virtual-camera parameters, a comparison is made between each input image and a corresponding image generated from the three-dimensional model in order to generate a comparison value or correlation coefficient. FIGS. 17A-B illustrate computation of the comparison value or correlation coefficient. As shown in FIG. 17A, a two-dimensional image 1702 $I_s$ is generated 1706 from the three-dimensional model 1704 using the virtual-camera parameters determined, as discussed above with reference to FIG. 8, for a corresponding input image $I_p$ 1708. Next, a contour line that encloses the teeth in the image is generated 1707. This contour line is then overlaid or superimposed over the original input image 1708 to produce an overlaid image 1710. As shown in FIG. 17A in inset 1712, for each pixel (x,y) lying along the contour line 1714, a small square, rectangular, or other compact region 1716, $\varepsilon_{x,y}$, can be constructed. The comparison values generated from the overlaid image 1710 involve computing the cost of the pixels that lie along the contour in both the input image $I_p$ and the image generated from the three-dimensional model $I_s$. The cost for a contour-overlapping pixel (x,y) is computed as shown in expression 1720 in FIG. 17B. When the absolute values or magnitudes of the gradients for pixel (x,y) in both images is greater than a threshold T, which has the value 3 in one implementation, the cost for the pixel is the dot product of the gradients for the pixel in the two images divided by the product of the magnitudes of the two gradients. Otherwise, the cost is 0. A fitness or similarity metric can be computed, as shown in equation 1722, as the sum of the costs of the pixels lying along the contour divided by the length of the contour, in pixels. An alternative fitness or similarity metric is shown in expression 1724. In the alternative fitness value, the cost for the two images is computed as the sum of the cost of the pixels along the contour divided by the sum of the maximum cost of any pixel in the region $\varepsilon_{x,y}$ for each of the pixels in the two images (x,y). This alternative metric has greater reliability when input images are slightly blurred by applying a Gaussian filter. Either fitness value or a linear combination of the two fitness values may be used as the computed similarity metric or correlation coefficient for the comparison of the two images.

It should be noted that, in general, color images are processed by the monitoring method. When gradients and Laplacian vectors are computed, they are computed based on an overall luminance or intensity computed from the three different color values of whatever color scheme is used to encode the images.

Figure 18:
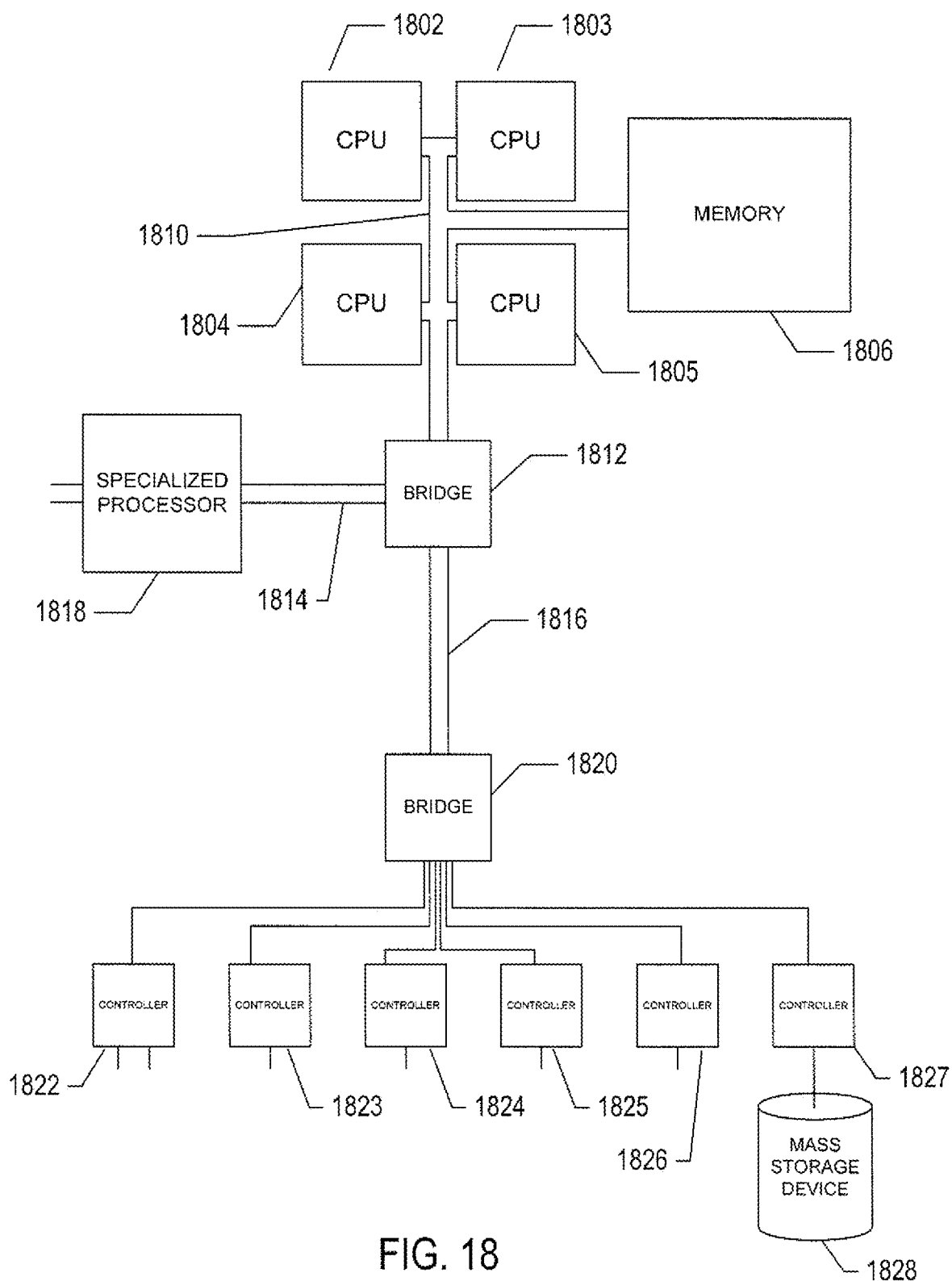
FIG. 18 provides a general architectural diagram for various types of computers, including computers used to implement dental-treatment monitoring systems.

FIG. 18 provides a general architectural diagram for various types of computers, including computers used to implement dental-treatment monitoring systems. The computer system contains one or multiple central processing units ("CPUs") 1802-1805, one or more electronic memories 1806 interconnected with the CPUs by a CPU/memory-subsystem bus 1810 or multiple busses, a first bridge 1812 that interconnects the CPU/memory-subsystem bus 1810 with additional busses 1814 and 1816, or other types of high-speed interconnection media, including multiple, high-speed serial interconnects. These busses or serial interconnections, in turn, connect the CPUs and memory with specialized processors, such as a graphics processor 1818, and with one or more additional bridges 1820, which are interconnected with high-speed serial links or with multiple controllers 1822-1827, such as controller 1827, that provide access to various different types of mass-storage devices 1828, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors.

Figure 19:
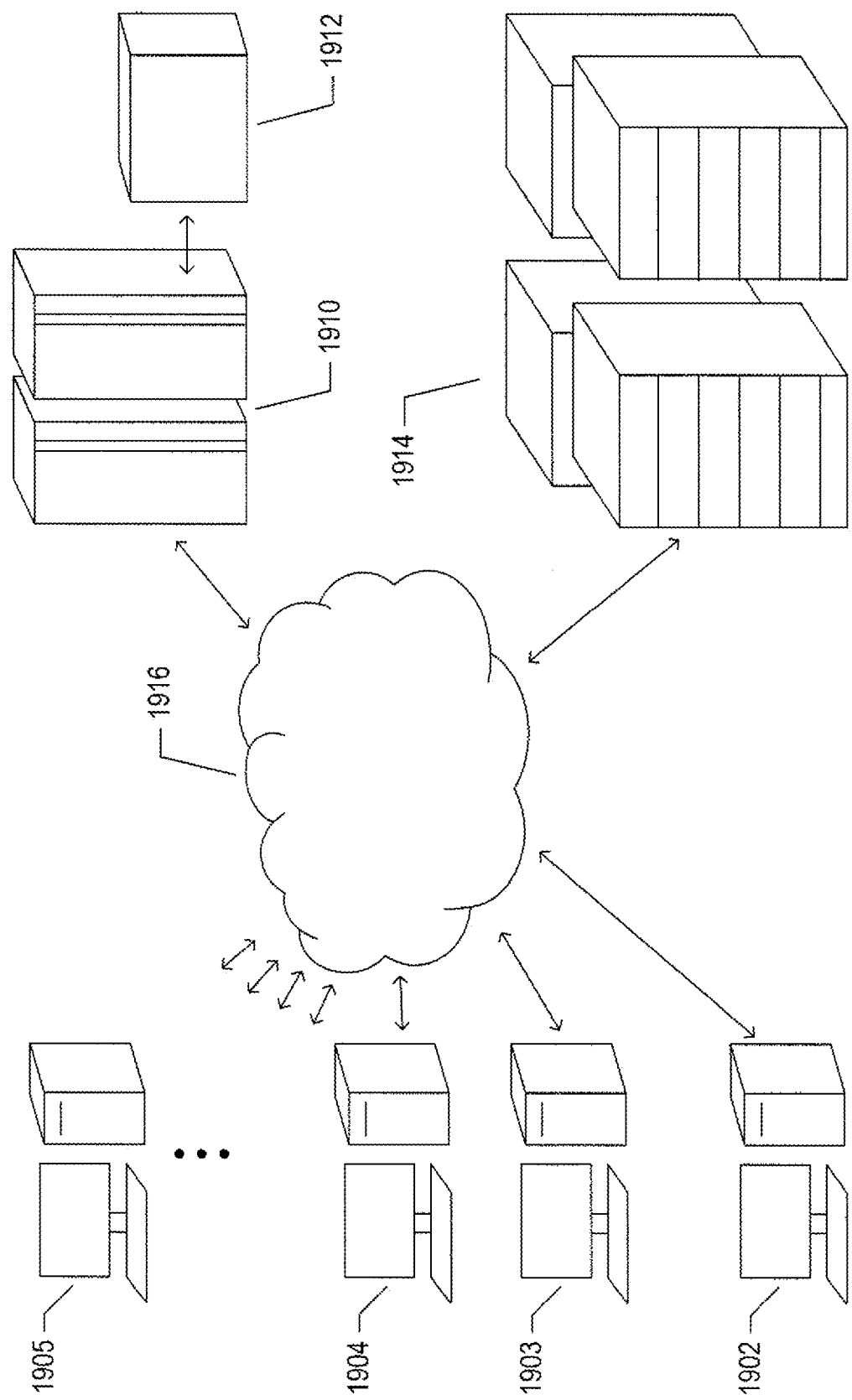
FIG. 19 illustrates an Internet-connected distributed computer system.

FIG. 19 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 19 shows a typical distributed system in which a large number of PCs 1902-1905, a high-end distributed mainframe system 1910 with a large data-storage system 1912, and a large computer center 1914 with large numbers of rack-mounted servers or blade servers all interconnected through various communications and networking systems that together comprise the Internet 1916. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 20:
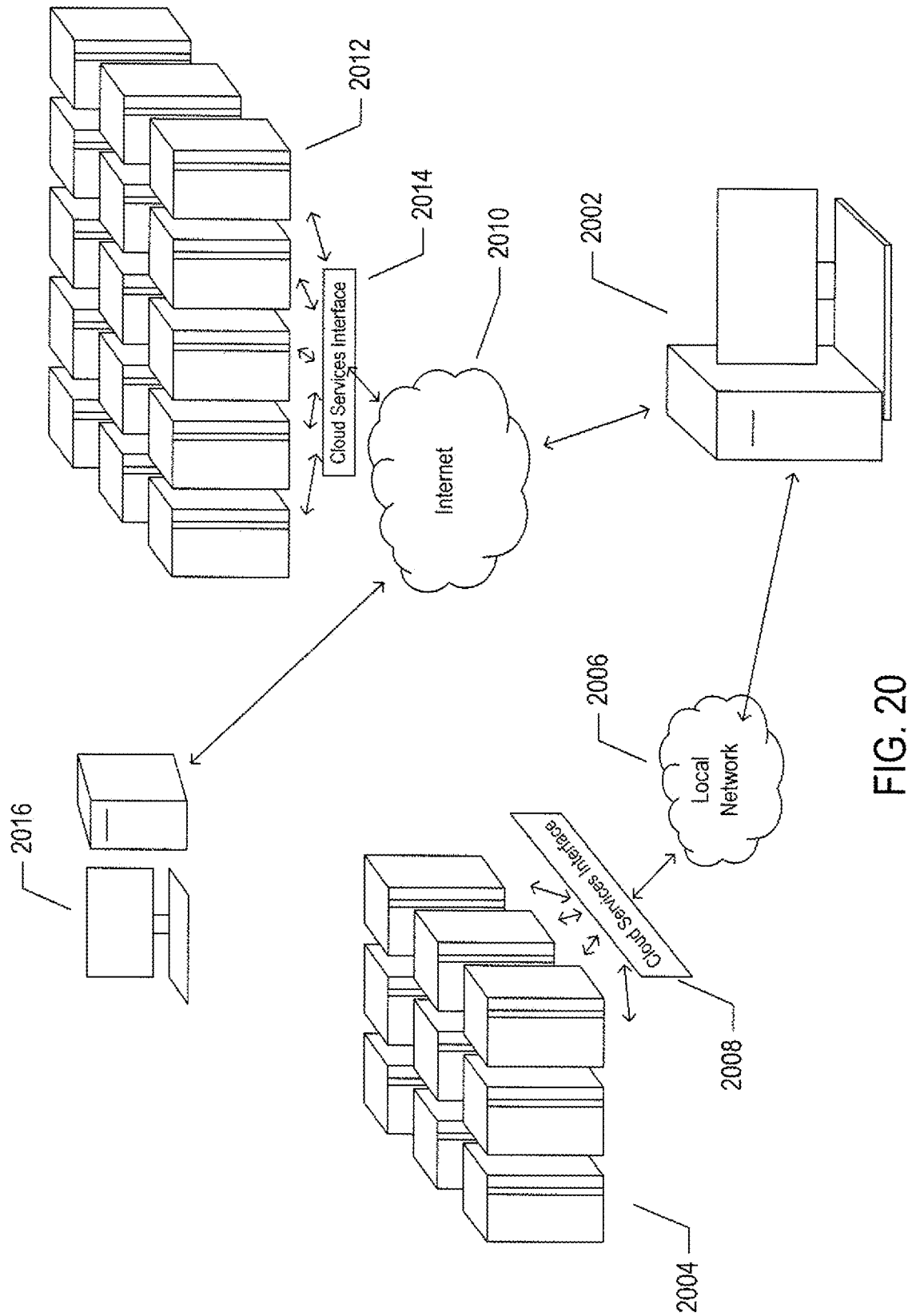
FIG. 20 illustrates cloud computing.

FIG. 20 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 20, a system administrator for an organization, using a PC 2002, accesses the organization's private cloud 2004 through a local network 2006 and private-cloud interface 2008 and also accesses, through the Internet 2010, a public cloud 2012 through a public-cloud services interface 2014. The administrator can, in either the case of the private cloud 2004 or public cloud 2012, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 2016.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 21:
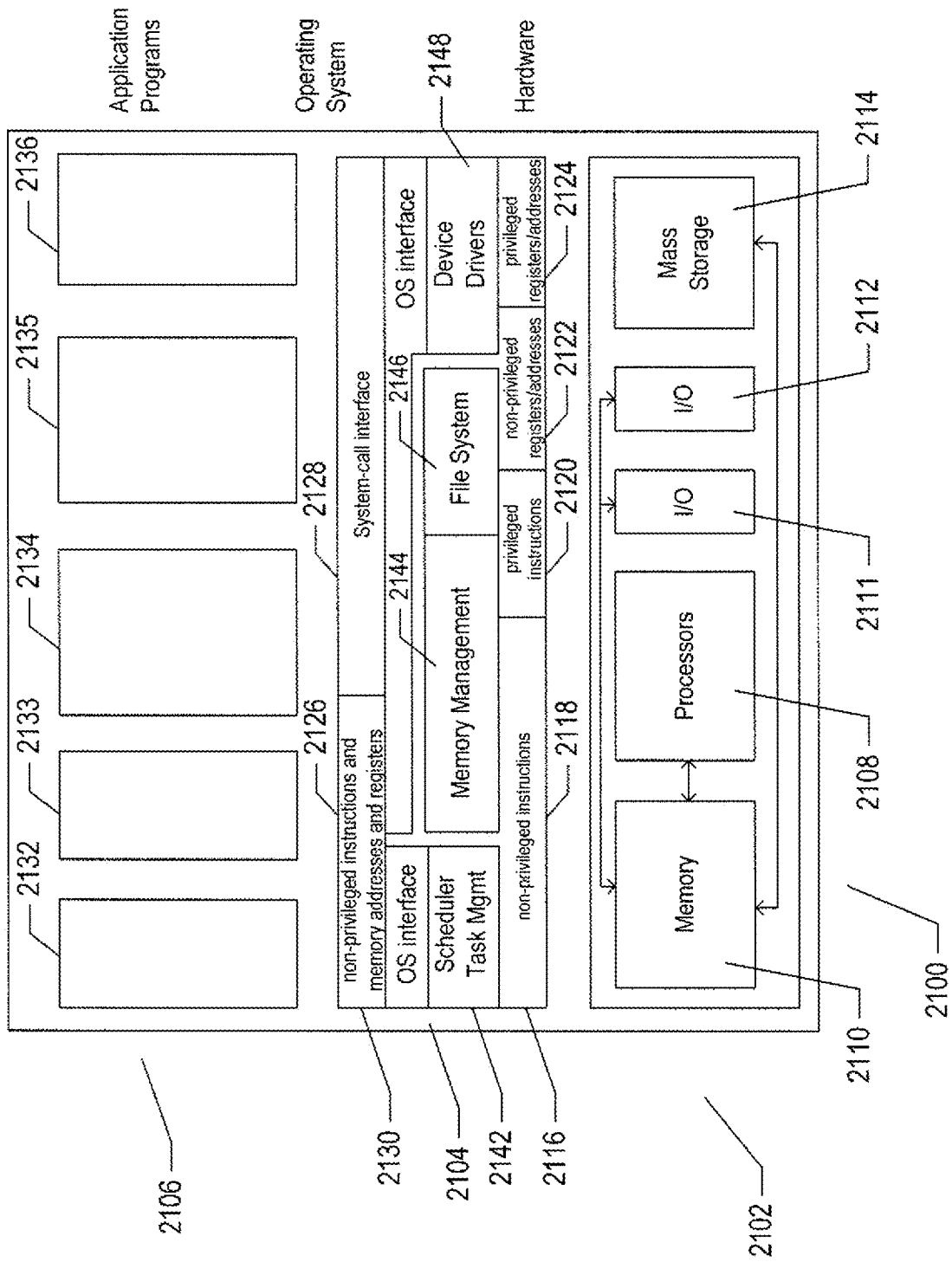
FIG. 21 illustrates generalized hardware and software components of a general-purpose computer system, such as a general-purpose computer system having an architecture similar to that shown in FIG. 1

FIG. 21 illustrates generalized hardware and software components of a general-purpose computer system, such as a general-purpose computer system having an architecture similar to that shown in FIG. 1. The computer system 2100 is often considered to include three fundamental layers: (1) a hardware layer or level 2102; (2) an operating-system layer or level 2104; and (3) an application-program layer or level 2106. The hardware layer 2102 includes one or more processors 2108, system memory 2110, various different types of input-output ("I/O") devices 2111 and 2112, and mass-storage devices 2114. Of course, the hardware level also includes many other components, including power supplies, internal communications links and busses, specialized integrated circuits, many different types of processor-controlled or microprocessor-controlled peripheral devices and controllers, and many other components. The operating system 2104 interfaces to the hardware level 2102 through a low-level operating system and hardware interface 2116 generally comprising a set of non-privileged computer instructions 2118, a set of privileged computer instructions 2120, a set of non-privileged registers and memory addresses 2122, and a set of privileged registers and memory addresses 2124. In general, the operating system exposes non-privileged instructions, non-privileged registers, and non-privileged memory addresses 2126 and a system-call interface 2128 as an operating-system interface 2130 to application programs 2132-2136 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 2142, memory management 2144, a file system 2146, device drivers 2148, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 2136 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 22A:
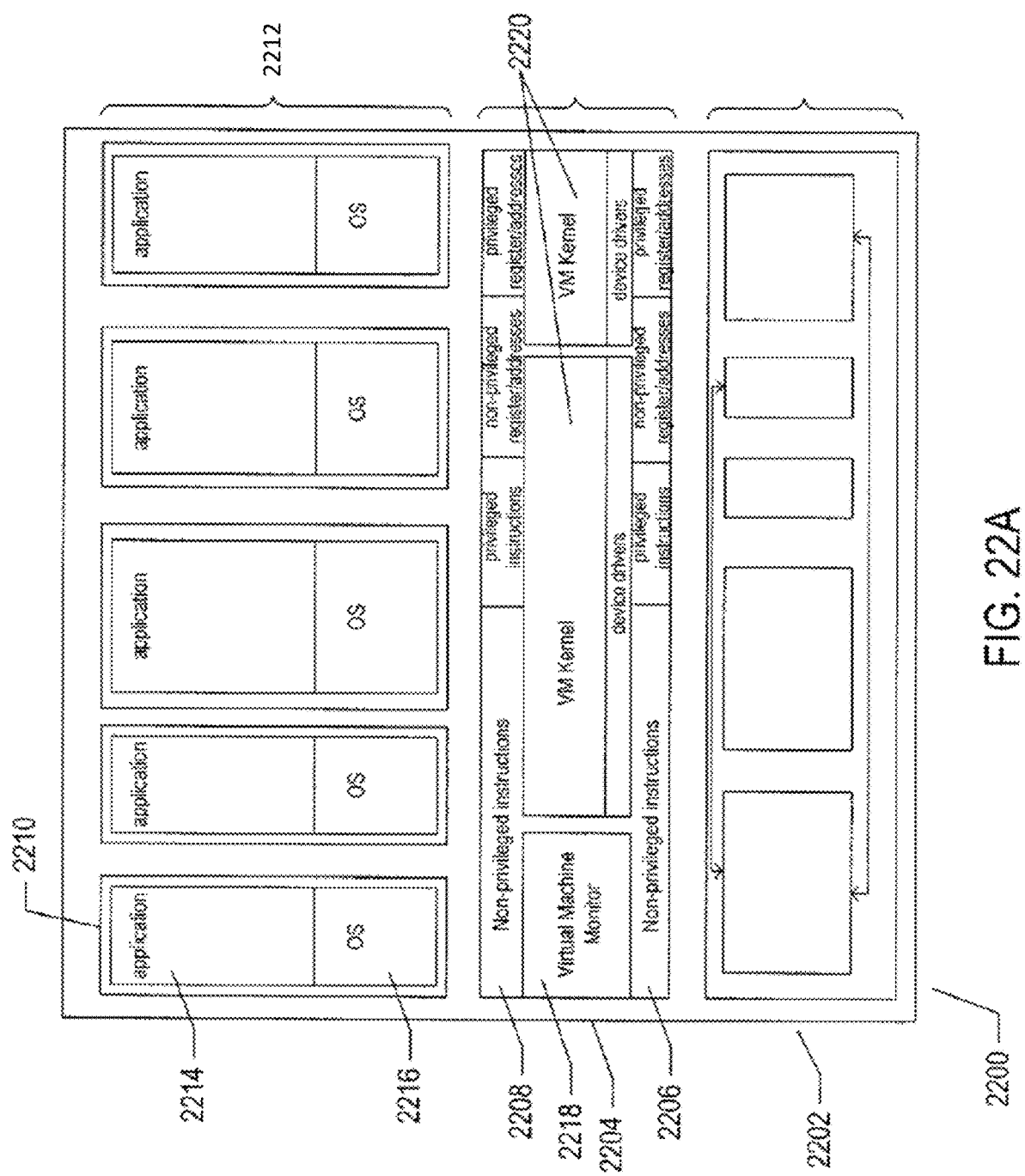
FIGS. 22A-B illustrates two types of virtual machine and virtual-machine execution environments.
Figure 22B:
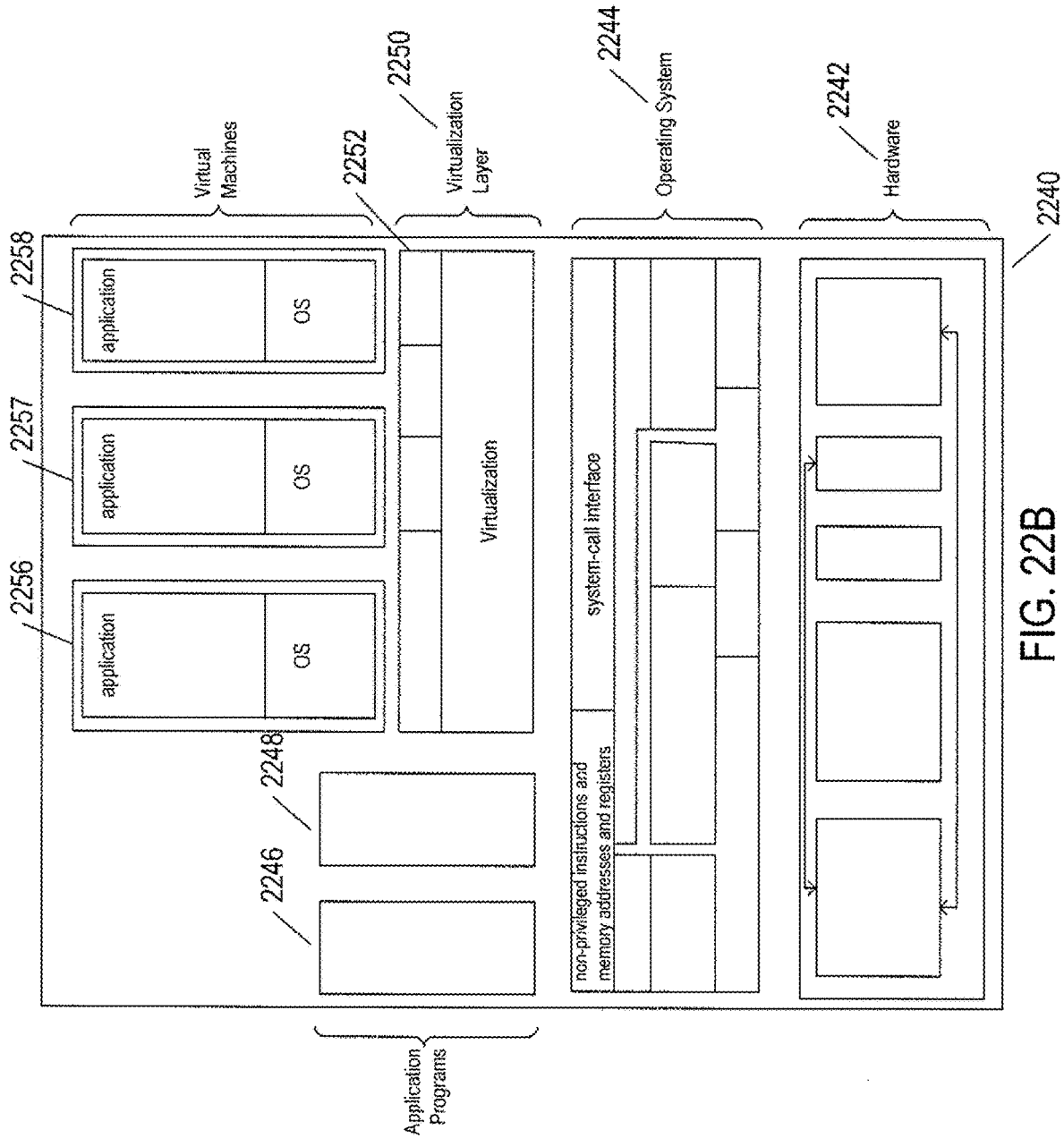

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 22A-B illustrate two types of virtual machine and virtual-machine execution environments. FIGS. 22A-B use the same illustration conventions as used in FIG. 21. FIG. 22A shows a first type of virtualization. The computer system 2200 in FIG. 22A includes the same hardware layer 2202 as the hardware layer 2102 shown in FIG. 21. However, rather than providing an operating system layer directly above the hardware layer, as in FIG. 21, the virtualized computing environment illustrated in FIG. 22A features a virtualization layer 2204 that interfaces through a virtualization-layer/hardware-layer interface 2206, equivalent to interface 2116 in FIG. 21, to the hardware. The virtualization layer provides a hardware-like interface 2208 to a number of virtual machines, such as virtual machine 2210, executing above the virtualization layer in a virtual-machine layer 2212. Each virtual machine includes one or more application programs or other higher-level computational entities packaged together with an operating system, referred to as a "guest operating system," such as application 2214 and guest operating system 2216 packaged together within virtual machine 2210. Each virtual machine is thus equivalent to the operating-system layer 2104 and application-program layer 2106 in the general-purpose computer system shown in FIG. 21. Each guest operating system within a virtual machine interfaces to the virtualization-layer interface 2208 rather than to the actual hardware interface 2206. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 2208 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 2218 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 2208, the accesses result in execution of virtualization-layer code to simulate or emulate the privileged resources. The virtualization layer additionally includes a kernel module 2220 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 22B illustrates a second type of virtualization. In FIG. 22B, the computer system 2240 includes the same hardware layer 2242 and software layer 2244 as the hardware layer 2102 shown in FIG. 21. Several application programs 2246 and 2248 are shown running in the execution environment provided by the operating system. In addition, a virtualization layer 2250 is also provided, in computer 2240, but, unlike the virtualization layer 2204 discussed with reference to FIG. 22A, virtualization layer 2250 is layered above the operating system 2244, referred to as the "host OS," and uses the operating system interface to access operating-system-provided functionality as well as the hardware. The virtualization layer 2250 comprises primarily a VMM and a hardware-like interface 2252, similar to hardware-like interface 2208 in FIG. 22A. The virtualization-layer/hardware-layer interface 2252, equivalent to interface 2116 in FIG. 21, provides an execution environment for a number of virtual machines 2256-2258, each including one or more application programs or other higher-level computational entities packaged together with a guest operating system.

Dental-monitoring systems may be implemented using single PCs or servers, may be implemented in distributed computing systems, or may be implemented using cloud-computing facilities. Similarly, practitioners may communicate with a dental-monitoring system using a PC, server, or many other processor-controlled devices, including tablets, lap tops, and smart phones.

Although the present invention has been described in terms of particular embodiments, it is not intended that the invention be limited to these embodiments. Modifications within the spirit of the invention will be apparent to those skilled in the art. For example, any of many different design and implementation parameters, including operating system, hardware platform, programming language, modular organization, control structures, data structures, and other such parameters may be varied to produce various alternative implementations. As another example, the two-dimensional images acquired from patients during treatments can be obtained by using any of a wide variety of different imaging devices, including two-dimensional digital cameras, three-dimensional digital cameras, film-based cameras with digital-conversion devices, and even non-optical imaging devices.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A computer-implemented method of assessing a dental treatment for a patient's teeth, comprising:
   receiving a two-dimensional image of the patient's teeth taken at a particular time during a course of the dental treatment;
   receiving a three-dimensional model representing an expected configuration of the patient's teeth at the particular time;
   projecting, in time, expected positions of the patient's teeth using the three-dimensional model to obtain a time-projected three-dimensional model of expected positions of the patient's teeth;
   generating an expected two-dimensional image from the time-projected three-dimensional model using virtual-camera parameters to model a configuration of a camera used to capture the received two-dimensional image of the patient's teeth;
   comparing the received two-dimensional image with the expected two-dimensional image generated from the time-projected three-dimensional model by calculating a fitness metric, wherein calculating the fitness metric comprises calculating a cost for each overlapping pixel along overlaid teeth contours of the received and expected two-dimensional images, wherein calculating the cost for each of one or more of the overlapping pixels comprises calculating a dot product of gradients for the overlapping pixel divided by the product of magnitudes of the gradients;

determining whether a configuration of the patient's teeth is within a threshold level of correspondence to the expected configuration of the patient's teeth based on the fitness metric; and responsive to the determination as to whether the configuration of the patient's teeth is within the threshold level, providing an indication relating to the dental treatment.

2. The method of claim 1, wherein comparing the received two-dimensional image with the expected two-dimensional image comprises
overlaying the teeth contours of the received and expected two-dimensional images.

3. The method of claim 1, wherein calculating the fitness metric further comprises calculating a sum of the costs of the overlapping pixels along overlaid teeth contours divided by a length of the overlaid teeth contours in pixels.

4. The method of claim 1, further comprising applying a Gaussian filter to the received two-dimensional image of the patient's teeth.

5. The method of claim 1, wherein calculating the cost for each overlapping pixel comprises constructing a compact region along the overlaid teeth contours.

6. The method of claim 5, wherein the compact region has a square or a rectangle shape.

7. The method of claim 1, wherein providing the indication relating to the dental treatment comprises providing an indication that the dental treatment is on track or off track.

8. The method of claim 1, wherein generating the expected two-dimensional image comprises matching an orientation and position of an origin a camera coordinate system used to take the two-dimensional image of the patient's teeth with a center of an image plane of a virtual camera used to generate the expected two-dimensional image.

9. The method of claim 1, further comprising:
determining an iteration variable N based on metadata associated with the received two-dimensional image; and
iteratively modifying the virtual-camera parameters N times to produce the expected two-dimensional image from the time-projected three-dimensional model.

10. The method of claim 9, wherein the metadata include one or more of: a text label, an indication of a standard type of view represented by the two-dimensional image, an image size, a date and time information, an indication of a camera model and make, an indication of a camera orientation, an indication of an aperture, an indication of a shutter speed, an indication of a focal length, an indication of a metering mode, and an indication of an image speed.

11. A dental-treatment monitoring system comprising:
one or more processors;
memory coupled to the one or more processors, wherein the memory includes computer-program instructions that, when executed by the one or more processors, cause the system to perform a computer-implemented method comprising:

receiving a two-dimensional image of a patient's teeth taken at a particular time during a course of a dental treatment;

receiving a three-dimensional model representing an expected configuration of the patient's teeth at the particular time;

projecting, in time, expected positions of the patient's teeth using the three-dimensional model to obtain a time-projected three-dimensional model of expected positions of the patient's teeth;

generating an expected two-dimensional image from the time-projected three-dimensional model using virtual-camera parameters to model a configuration of a camera used to capture the received two-dimensional image of the patient's teeth;

comparing the received two-dimensional image with the expected two-dimensional image generated from the time-projected three-dimensional model by calculating a fitness metric, wherein calculating the fitness metric comprises calculating a cost for each overlapping pixel along overlaid teeth contours of the received and expected two-dimensional images, wherein calculating the cost for each of one or more of the overlapping pixels comprises calculating a dot product of gradients for the overlapping pixel divided by the product of magnitudes of the gradients;

determining whether a configuration of the patient's teeth is within a threshold level of correspondence to the expected configuration of the patient's teeth based on the fitness metric; and responsive to the determination as to whether the configuration of the patient's teeth is within the threshold level, providing an indication relating to the dental treatment.

12. The system of claim 11, wherein comparing the received two-dimensional image with the expected two-dimensional image comprises
overlaying the teeth contours of the received and expected two-dimensional images.

13. The system of claim 11, wherein calculating the fitness metric further comprises calculating a sum of the costs of the overlapping pixels along overlaid teeth contours divided by a length of the overlaid teeth contours in pixels.

14. The system of claim 11, wherein calculating the cost of each of the one or more of the overlapping pixels comprises constructing a compact region along the overlaid teeth contours.

15. The system of claim 14, wherein the compact region has a square or a rectangle shape.

16. A computer-implemented method of assessing a dental treatment for a patient's teeth, comprising:
receiving a two-dimensional image of the patient's teeth taken at a particular time during a course of the dental treatment;

receiving a three-dimensional model representing an expected configuration of the patient's teeth at the particular time;

projecting, in time, expected positions of the patient's teeth using the three-dimensional model to obtain a time-projected three-dimensional model of expected positions of the patient's teeth;

generating an expected two-dimensional image from the time-projected three-dimensional model using virtual-camera parameters to model a configuration of a camera used to capture the received two-dimensional image of the patient's teeth;

comparing the received two-dimensional image with the expected two-dimensional image generated from the time-projected three-dimensional model by calculating a fitness metric, wherein calculating the fitness metric comprises calculating a cost for each overlapping pixel along overlaid teeth contours of the received and expected two-dimensional images, wherein calculating the cost for each of one or more of the overlapping pixels comprises calculating a dot product of gradients for the overlapping pixel divided by the product of magnitudes of the gradients;

determining whether a configuration of the patient's teeth is within a threshold level of correspondence to the expected configuration of the patient's teeth from the fitness metric; and responsive to the determination as to whether the configuration of the patient's teeth is within the threshold level, providing an indication relating to the dental treatment.

17. The method of claim 16, further comprising:
determining an iteration variable N based on metadata associated with the received two-dimensional image; and iteratively modifying the virtual-camera parameters N times to produce the expected two-dimensional image from the time-projected three-dimensional model.

18. The method of claim 17, wherein the metadata include one or more of: a text label, an indication of a standard type of view represented by the two-dimensional image, an image size, a date and time information, an indication of a camera model and make, an indication of a camera orientation, an indication of an aperture, an indication of a shutter speed, an indication of a focal length, an indication of a metering mode, and an indication of an image speed.

19. The method of claim 16, wherein calculating the fitness metric further comprises calculating a sum of the costs of the overlapping pixels along overlaid teeth contours divided by a length of the overlaid teeth contours in pixels.

20. The system of claim 11, wherein providing the indication relating to the dental treatment comprises providing an indication that the dental treatment is on track or off track.

* * * * *